United States Patent
Kondo et al.

(10) Patent No.: US 9,463,407 B2
(45) Date of Patent: Oct. 11, 2016

(54) HONEYCOMB STRUCTURE

(71) Applicant: NGK Insulators, Ltd., Nagoya (JP)

(72) Inventors: Takahiro Kondo, Nagoya (JP); Koji Nagata, Nagoya (JP); Yasushi Kato, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 26 days.

(21) Appl. No.: 14/661,266

(22) Filed: Mar. 18, 2015

(65) Prior Publication Data
US 2015/0273461 A1 Oct. 1, 2015

(30) Foreign Application Priority Data

Mar. 27, 2014 (JP) ................................ 2014-065156

(51) Int. Cl.
| | |
|---|---|
| *B01D 46/24* | (2006.01) |
| *B01J 35/04* | (2006.01) |
| *B01D 53/94* | (2006.01) |
| *B01J 35/02* | (2006.01) |
| *B01J 37/00* | (2006.01) |
| *C04B 38/00* | (2006.01) |
| *B01J 37/34* | (2006.01) |
| *B01J 35/10* | (2006.01) |
| *C04B 111/00* | (2006.01) |

(52) U.S. Cl.
CPC ......... *B01D 46/2474* (2013.01); *B01D 53/945* (2013.01); *B01J 35/023* (2013.01); *B01J 35/04* (2013.01); *B01J 37/0018* (2013.01); *C04B 38/0009* (2013.01); *B01D 2255/9155* (2013.01); *B01J 35/10* (2013.01); *B01J 37/346* (2013.01); *C04B 2111/00818* (2013.01); *Y02T 10/22* (2013.01); *Y10T 428/24149* (2015.01)

(58) Field of Classification Search
None
See application file for complete search history.

(56) References Cited

U.S. PATENT DOCUMENTS

| | | | | |
|---|---|---|---|---|
| 4,447,130 | A | * | 5/1984 | Christiansen ......... C03B 23/207 |
| | | | | 428/116 |
| 4,835,044 | A | * | 5/1989 | Hattori ..................... B01J 35/04 |
| | | | | 428/116 |

(Continued)

FOREIGN PATENT DOCUMENTS

| | | |
|---|---|---|
| DE | 600 27 688 T2 | 5/2007 |
| EP | 1 125 704 B1 | 5/2006 |

(Continued)

OTHER PUBLICATIONS

German Examination Report (Application No. 10 2015 003 434.0) dated Oct. 15, 2015 (with English translation).

*Primary Examiner* — David Sample
*Assistant Examiner* — Nicholas W Jordan
(74) *Attorney, Agent, or Firm* — Burr & Brown, PLLC

(57) ABSTRACT

A honeycomb structure including a honeycomb structure body that includes porous partition walls defining a plurality of cells each to function as a through channel for fluid extending from a first end face to a second end face, in which, in a cross-section perpendicular a direction in which cells of the honeycomb structure body extend, portions at which the partition walls intersect to each other are intersecting portions, and in sets of the intersecting portions corresponding to 10% or more of the total number of sets of two adjacent intersecting portions, a ratio of a thickness $X_2$ of the partition wall in the intersecting portion to a maximum thickness $X_1$ of the partition wall between the two adjacent intersecting portions is 0.1 to 0.8.

6 Claims, 14 Drawing Sheets

(56) References Cited

U.S. PATENT DOCUMENTS

| | | | |
|---|---|---|---|
| 7,393,377 B2 * | 7/2008 | Kasai | C04B 38/0006 428/116 |
| 7,655,195 B1 | 2/2010 | Ichikawa et al. | |
| 2005/0191461 A1 * | 9/2005 | Kasai | C04B 38/0006 428/116 |

FOREIGN PATENT DOCUMENTS

| | | |
|---|---|---|
| EP | 2 572 770 A1 | 3/2013 |
| JP | 2011-194342 A1 | 10/2011 |
| JP | 2013-053594 A1 | 3/2013 |

* cited by examiner

HONEYCOMB STRUCTURE

This application is based on Japanese Patent Application No. 2014-065156 filed on Mar. 27, 2014 in the Japan Patent Office, the entire contents of which are incorporated herein by reference.

BACKGROUND OF THE INVENTION

1. Field of the Invention p The present invention relates to a honeycomb structure. More specifically, the invention relates to a honeycomb structure which can be used as a catalyst carrier for loading an exhaust gas purifying catalyst.

2. Description of the Related Art

Exhaust gases emitted from an internal combustion engine such as an engine of an automobile contain harmful substances such as carbon monoxide (CO), hydrocarbon (HC), and nitrogen oxide ($NO_x$). At the time of reducing such harmful substances and purifying exhaust gases, catalytic reaction is widely used. In this catalytic reaction, harmful substances such as carbon monoxide (CO) can be converted into harmless substances by a simple means for bringing an exhaust gas into contact with a catalyst. Therefore, in an automobile or the like, exhaust gases are purified by providing a catalyst in an exhaust system from an engine or the like.

When a catalyst is provided in an exhaust system of an automobile or the like, a honeycomb catalytic body formed by loading a catalyst in partition walls of a honeycomb structure is used. In the honeycomb catalytic body, a honeycomb-shaped structure (a honeycomb structure) is formed by the partition walls and an exhaust gas flows into each of a plurality of cells surrounded by the partition walls. In the honeycomb catalytic body, since the total surface area of the partition walls forming the honeycomb structure becomes larger, frequency of contact between the catalyst loaded on the partition walls and the exhaust gas is high. For this reason, according to the honeycomb catalytic body, high exhaust gas purification effect can be realized (for example, Patent Documents 1 and 2). In recent years, a request level of exhaust gas regulation becomes higher, and thus in order to meet this request level, there is a tendency that an amount of the catalyst to be loaded is increased.

[Patent Document 1] JP-A-2011-194342
[Patent Document 2] JP-A-2013-053594

SUMMARY OF THE INVENTION

However, in a case where a large amount of the catalyst is loaded on the partition walls of the honeycomb structure, catalyst layers to be laminated on the surfaces of the partition walls become thicker. As a result, pressure loss at the time of passing of the exhaust gas is increased.

In view of the above problems, an object of the invention is to provide a honeycomb structure in which an increase in pressure loss can be reduced even in a case where a large amount of the catalyst is loaded on the partition walls.

According to the invention, there is provided a honeycomb structure described below.

(1) A honeycomb structure including a honeycomb structure body that includes porous partition walls defining a plurality of cells each to function as a through channel for fluid extending from a first end face as one end face to a second end face as the other end face, in which, in a cross-section perpendicular a direction in which the cells of the honeycomb structure body extend, portions at which the partition walls intersect to each other are intersecting portions, and in sets of the intersecting portions corresponding to 10% or more of the total number of sets of two adjacent intersecting portions, a ratio of a thickness $X_2$ of the partition wall in the intersecting portion to a maximum thickness $X_1$ of the partition wall between the two adjacent intersecting portions is 0.1 to 0.8.

(2) The honeycomb structure describe in the above item (1), in which, in the cross-section perpendicular to the direction in which the cells of the honeycomb structure body extend, the ratio of the thickness $X_2$ of the partition wall in the intersecting portion to the maximum thickness $X_1$ of the partition wall between the two adjacent intersecting portions is 0.1 to 0.8 in all of the sets of two adjacent intersecting portions.

(3) The honeycomb structure described in the above item (1) or (2), in which, in the cross-section perpendicular to the direction in which the cells of the honeycomb structure body extend, the partition walls define complete cells, which are the cells that are not located at an outermost circumference of the honeycomb structure body, among the plurality of cells, in a substantially polygonal shape.

(4) The honeycomb structure described in the above item (3), in which, in the cross-section perpendicular to the direction in which the cells of the honeycomb structure body extend, the partition walls define the complete cells in at least either a substantially quadrangular shape or a substantially hexagonal shape.

According to the honeycomb structure of the invention, when the ratio of the thickness $X_2$ of the partition wall in the intersecting portion to the maximum thickness $X_1$ of the partition wall between the adjacent intersecting portions is 0.1 to 0.8 as described above, an increase in pressure loss can be reduced even when a large amount of the catalyst is loaded on the partition walls.

DESCRIPTION OF THE PREFERRED EMBODIMENTS

Hereinafter, embodiments of the invention will be described with reference to the drawings. The invention is not limited to the following embodiments and can be changed, modified and improved without departing from the scope of the invention.

Figure 1:
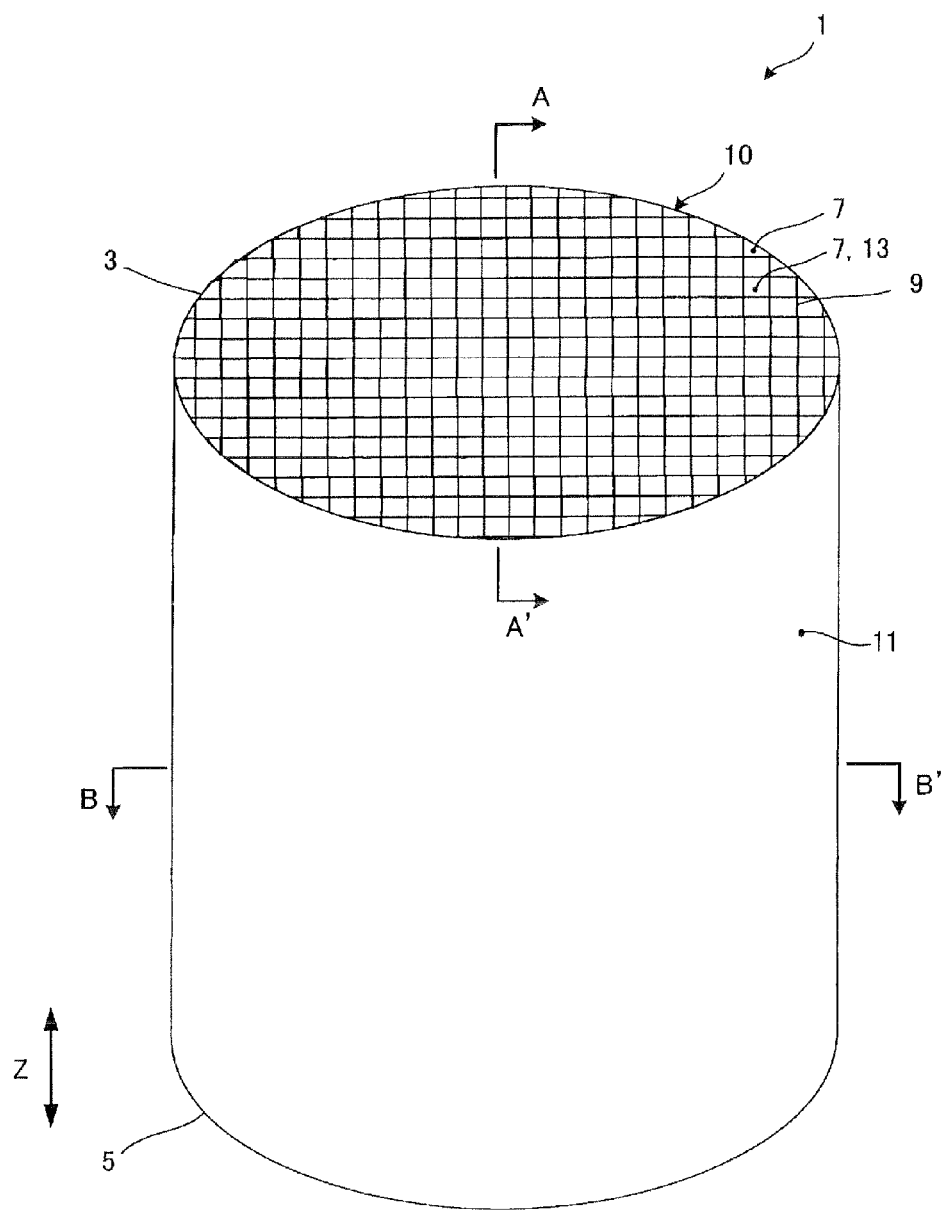
FIG. 1 is a schematic perspective view of a honeycomb structure according to an embodiment of the invention.
Figure 2:
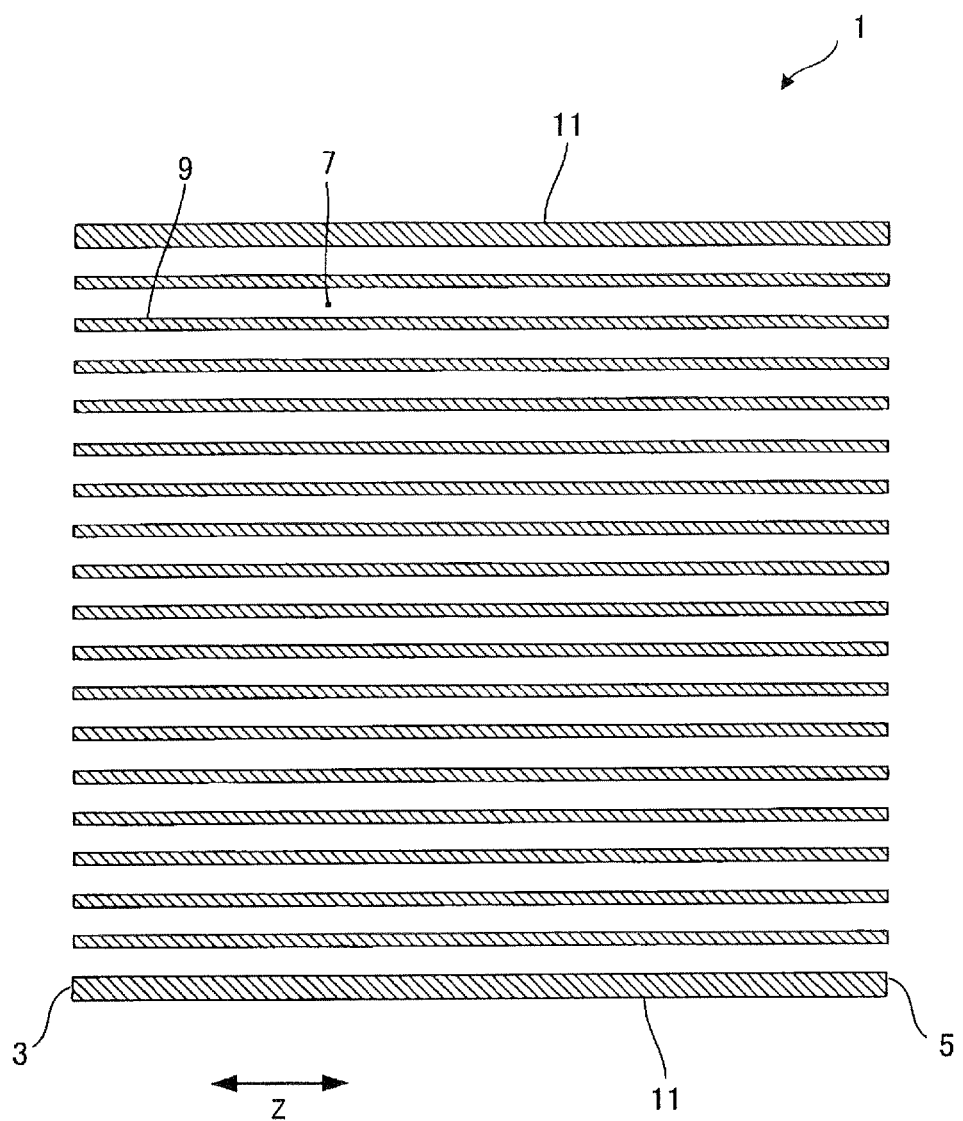
FIG. 2 is a schematic view of the A-A' cross-section of FIG. 1.
Figure 3:
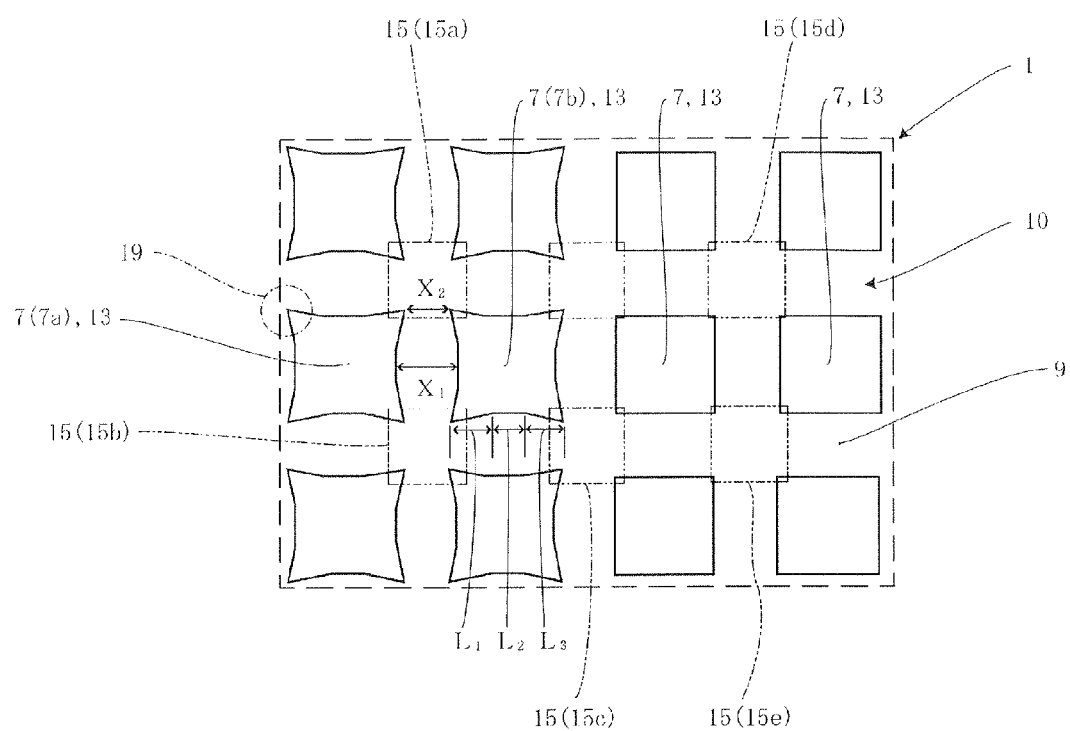
FIG. 3 is an enlarged schematic view showing a portion of the B-B' cross-section of FIG. 1.

1. Honeycomb Structure:

As shown in FIGS. 1 to 3, a honeycomb structure 1 according to an embodiment of the invention includes a honeycomb structure body 10 that includes porous partition walls 9 defining a plurality of cells 7 each to function as a through channel for fluid extending from a first end face 3 as one end face to a second end face 5 as the other end face. In a cross-section perpendicular to a direction in which the cells 7 of the honeycomb structure body 10 extend (hereinafter, referred to as a "Z direction"), portions at which the partition walls 9 intersect to each other are intersecting portions 15, and in sets of the intersecting portions 15 corresponding to 10% or more of the total number of sets of two adjacent intersecting portions 15, a ratio of a thickness $X_2$ of the partition wall 9 in the intersecting portion 15 to a maximum thickness $X_1$ of the partition wall 9 between the two adjacent intersecting portions 15 is 0.1 to 0.8. Hereinafter, the maximum thickness $X_1$ of the partition wall 9 described above is simply referred to as the "maximum thickness $X_1$." Further, the thickness $X_2$ of the partition wall 9 described above is simply referred to as the "thickness $X_2$." Furthermore, the ratio of the thickness $X_2$ to the maximum thickness $X_1$ s simply referred to as the "$X_2/X_1$ ratio." Incidentally, FIG. 1 is a schematic perspective view of the honeycomb structure 1 according to an embodiment of the invention. FIG. 2 is a schematic view of the A-A' cross-section of FIG. 1. FIG. 3 is an enlarged schematic view showing a portion of the B-B' cross-section of FIG. 1.

To describe with reference to FIG. 3, for example, regarding a set of an intersecting portion 15a and an intersecting portion 15b, the maximum thickness $X_1$ and the thickness $X_2$ in the cross-section perpendicular to the Z direction of the honeycomb structure body 10 are obtained by a method as described below. To describe with reference to the intersecting portion 15a and the intersecting portion 15b in FIG. 3, first, the maximum thickness $X_1$ is the maximum thickness of the partition wall 9 between the intersecting portion 15a and the intersecting portion 15b. Further, the thickness $X_2$ of the partition wall 9 in the intersecting portion 15a is the shortest distance between cells 7a and 7b, which are adjacent to each other across a part of the partition wall 9, in which the maximum thickness $X_1$ described above is measured, interposed therebetween, in the intersecting portion 15a.

In the schematic cross-sectional view shown in FIG. 3, regarding the set of the intersecting portion 15a and the intersecting portion 15b, the $X_2/X_1$ ratio satisfies 0.1 to 0.8 in the both of the intersecting portion 15a and the intersecting portion 15b. On the other hand, regarding the set of an intersecting portion 15d and an intersecting portion 15e, the $X_2/X_1$ ratio is 1 in the both of the intersecting portion 15d and the intersecting portion 15e. The thickness of the partition wall 9 between the intersecting portion 15d and the intersecting portion 15e is uniform.

As shown in FIG. 3, in the honeycomb structure 1, regarding the set of the intersecting portions 15 having the $X_2/X_1$ ratio satisfying 0.1 to 0.8, the thickness of the partition wall 9 in at least one of the intersecting portions 15 constituting the set of the intersecting portions 15 is thinner than the thickness of the middle portion of the partition wall 9 between the intersecting portions 15 constituting the set of the intersecting portions 15. As a result, in the honeycomb structure 1, regarding the set of the intersecting portions 15 having the $X_2/X_1$ ratio satisfying 0.1 to 0.8, the partition walls 9 have recess portions 19.

Figure 4:
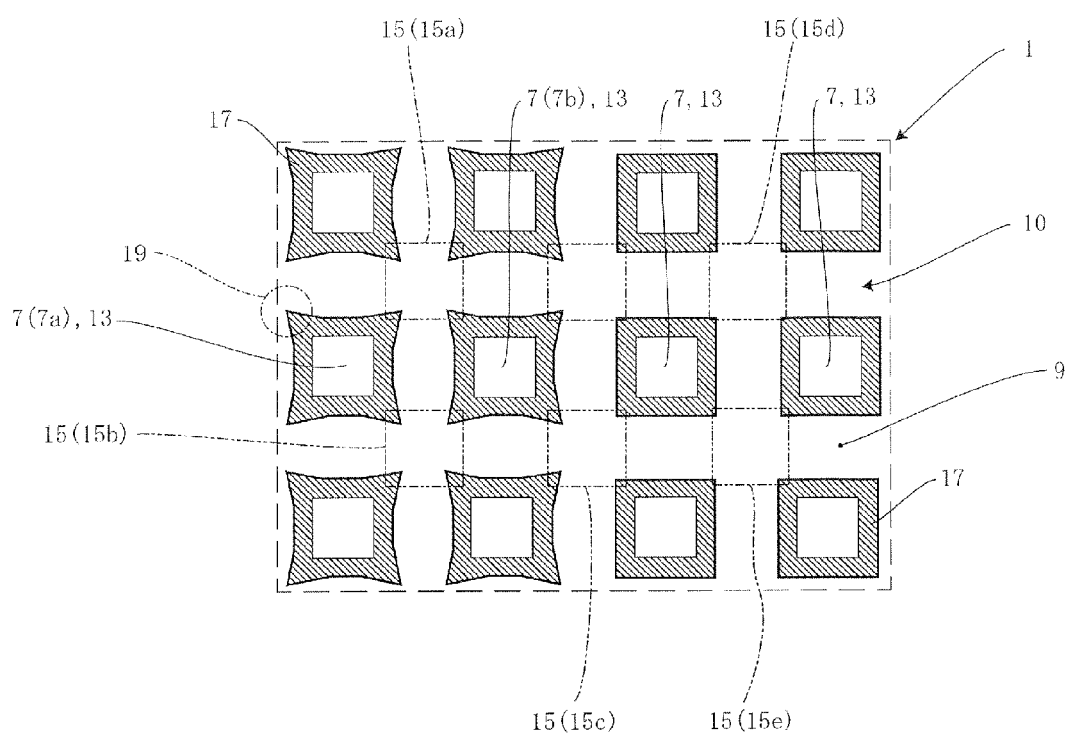
FIG. 4 is a cross-sectional view schematically showing a state in which a catalyst is loaded on partition walls of the honeycomb structure shown in FIG. 1.

FIG. 4 is a cross-sectional view schematically showing a state in which a catalyst 17 is loaded on the partition walls 9 of the honeycomb structure 1. As shown in the drawing, in the honeycomb structure 1, regarding the intersecting portions 15 having the $X_2/X_1$ ratio satisfying 0.1 to 0.8, the catalyst 17 can be filled in the recess portions 19. For this reason, according to the honeycomb structure 1, the cross-sectional areas of openings of the cells 7 are not excessively decreased even when the catalyst 17 is loaded in an amount as large as the amount corresponding to the catalyst 17 to be loaded on at least the recess portions 19. That is, according to the honeycomb structure 1, the cross-sectional areas of openings of the cells 7 are easily secured even when an amount of the catalyst 17 to be loaded on the partition walls 9 is increased, as compared with a case where the partition walls having a uniform thickness (partition walls not having recess portions) as described in the related art define cells. As a result, according to the honeycomb structure 1, an increase in pressure loss can be reduced even when an amount of the catalyst 17 to be loaded on the partition walls 9 is increased.

Even in a case where the thickness of each partition walls 9 in the intersecting portions 15 becomes thin due to the presence of the recess portions 19, when the catalyst 17 is loaded on the partition walls 9, the recess portions 19 are buried by the catalyst 17 and thus the structural strength is reinforced even in the intersecting portions 15.

In the honeycomb structure 1, the number of the sets of the intersecting portions 15 having the $X_2/X_1$ ratio of 0.1 to 0.8 is preferably 10% or more of the total number of the sets of the intersecting portions 15. In a case where the number of the sets of the intersecting portions 15 having the $X_2/X_1$ ratio of 0.1 to 0.8 is 10% or more of the total number of the sets of the intersecting portions 15, an increase in pressure loss can be further reduced even when the amount of the catalyst 17 to be loaded on the partition walls 9 is further increased. Further, in a case where the number of the sets of the intersecting portions 15 having the $X_2/X_1$ ratio of 0.1 to 0.8 is 10% or more of the total number of the sets of the intersecting portions 15, when the catalyst 17 is loaded on the partition walls 9, the recess portions 19 are buried by the catalyst 17 and thus the structural strength is further reinforced even in the intersecting portions 15. Furthermore, in the honeycomb structure 1, the number of the sets of the intersecting portions 15 having the $X_2/X_1$ ratio of 0.1 to 0.8 is more preferably 30 to 100% and most preferably 100% of the total number of the sets of the intersecting portions 15.

Figure 5:
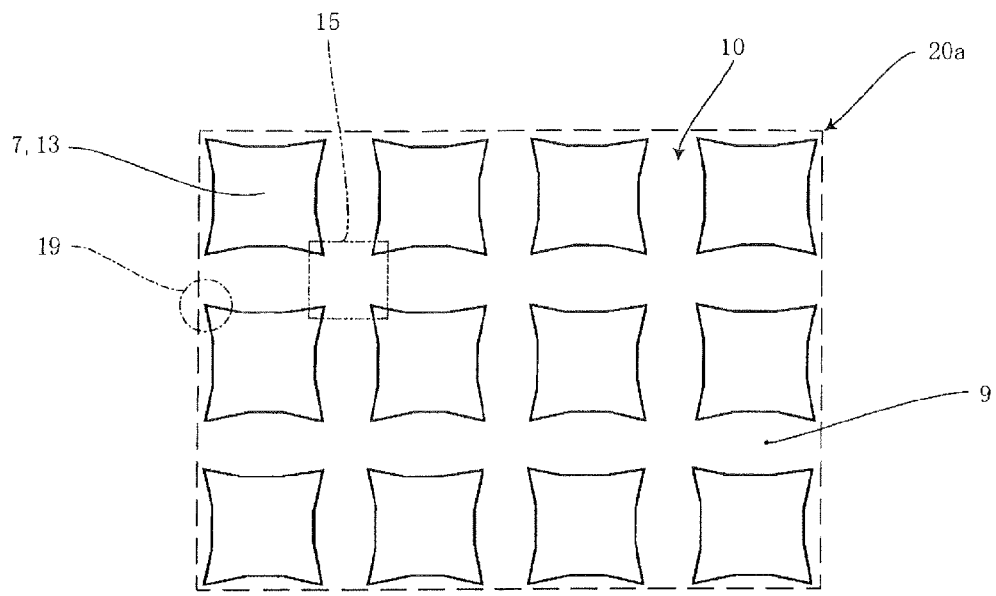
FIG. 5 is an enlarged schematic view showing a portion of a cross-section perpendicular to a direction in which cells of a honeycomb structure constituting another embodiment of the invention extend.

FIG. 5 is an enlarged schematic view showing a portion of the cross-section perpendicular to the Z direction of a honeycomb structure 20a constituting another embodiment of the invention. In the cross-section perpendicular to the Z direction of the honeycomb structure body 10 as shown in the honeycomb structure 20a, the $X_2/X_1$ ratio is most preferably 0.1 to 0.8 in all of the sets of two adjacent intersecting portions 15. When the $X_2/X_1$ ratio is 0.1 to 0.8 in all of the sets of intersecting portions 15 as shown in the honeycomb structure 20a, an effect of reducing an increase in pressure loss of the catalyst 17 to be loaded on the partition walls 9 is more easily exhibited.

As in the honeycomb structures 1 and 20a shown in FIGS. 3 and 5, in the cross-section perpendicular to the Z direction of the honeycomb structure body 10, it is preferable that the partition walls 9 define complete cells 13, which are the cells 7 that are not located at an outermost circumference of the honeycomb structure body 10, among the plurality of cells 7, in a substantially polygonal shape. When the partition walls 9 define the complete cells 13 in a substantially polygonal shape, the mechanical strength of the honeycomb structure 1 is improved.

The description "the partition walls 9 define the complete cells 13 in a substantially polygonal shape" in this specification means that the complete cells 13 are surrounded by sides of the partition walls 9 having a substantially linear shape. Here, the description "sides of the partition walls 9 having a substantially linear shape" is defined as follows. First, the partition wall 9 between adjacent intersecting portions 15 is divided from one intersecting portion 15 toward the other intersecting portion 15 equally among three. Then, when the middle portion of the partition wall 9 which has been divided equally among three between the adjacent intersecting portions 15 has a uniform thickness and extends in a linear shape, the sides of the partition walls 9 between the adjacent intersecting portions 15 are formed in a substantially linear shape. To describe with reference to FIG. 3, the partition wall 9 between the intersecting portion 15b and an intersecting portion 15c is divided from the intersecting portion 15b toward the intersecting portion 15c equally among three, a region $L_1$, a region $L_2$, and a region $L_3$. Then, when the partition wall 9 in the region $L_2$ which is located at the middle portion among the region $L_1$ to the region $L_3$ has a uniform thickness and extends in a linear shape, the sides of the partition walls 9 between the intersecting portion 15b and the intersecting portion 15c are formed in a substantially linear shape. Further, when all of the sides of the partition wall 9 which surround the cell 7 are a substantially linear shape as in a cell 7b in FIG. 3, the partition wall 9 defines the cell 7 (the complete cell 13) in a substantially polygonal shape.

Further, in the cross-section perpendicular to the Z direction of the honeycomb structure body 10, the partition walls 9 define the complete cells 13 preferably in at least either a substantially quadrangular shape or a substantially hexagonal shape, and particularly, preferably in a substantially hexagonal shape. When the partition walls 9 define the complete cells 13 in a substantially quadrangular shape or a substantially hexagonal shape, the mechanical strength of the honeycomb structure 1 is further improved. In particular, when the partition walls 9 define the complete cells 13 in a substantially hexagonal shape, the total surface area of the partition walls 9 becomes larger as compared with a case where the partition walls 9 define the complete cells 13 in a substantially quadrangular shape, and thus purification effect of the catalyst 17 can be improved when the catalyst 17 is loaded.

In the cross-section perpendicular to the Z direction of the honeycomb structure body 10, it is more preferable that the partition walls 9 define the complete cells 13 in at least either a substantially quadrangular shape or substantially hexagonal shape and the $X_2/X_1$ ratio be 0.1 to 0.8 in all of the set of two adjacent intersecting portions 15. According to this configuration, the structural strength of the honeycomb structure 1 is further improved, and an effect of reducing an increase in pressure loss associated with an increase in amount of the catalyst 17 to be loaded on the partition walls 9 is more easily exhibited. In particular, in the cross-section perpendicular to the Z direction of the honeycomb structure body 10, it is most preferable that the partition walls 9 define the complete cells 13 in a substantially hexagonal shape and the $X_2/X_1$ ratio be 0.1 to 0.8 in all of the set of two adjacent intersecting portions 15.

Figure 6:
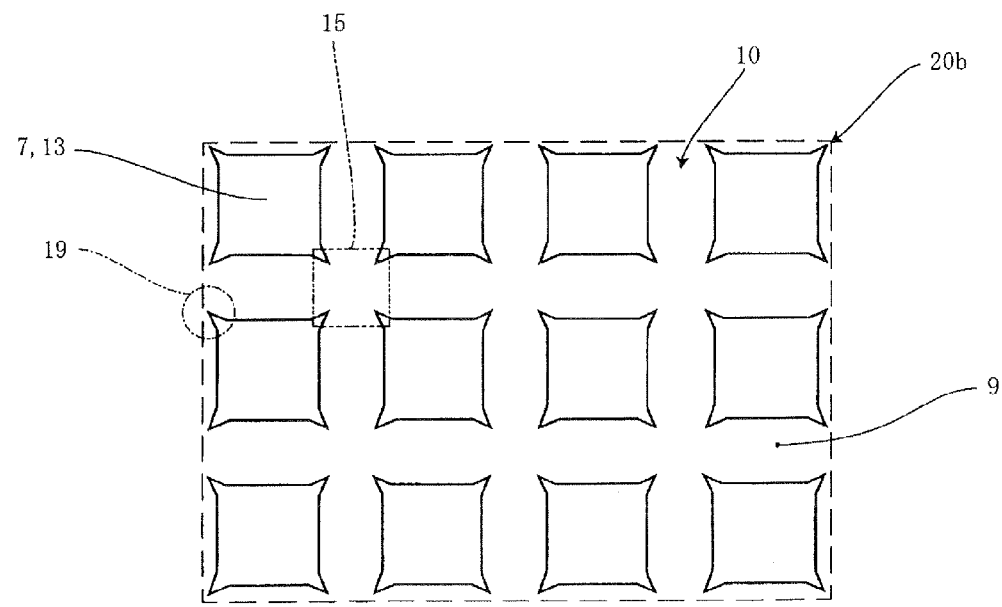
FIG. 6 is an enlarged schematic view showing a portion of a cross-section perpendicular to a direction in which cells of a honeycomb structure constituting still another embodiment of the invention extend.
Figure 7:
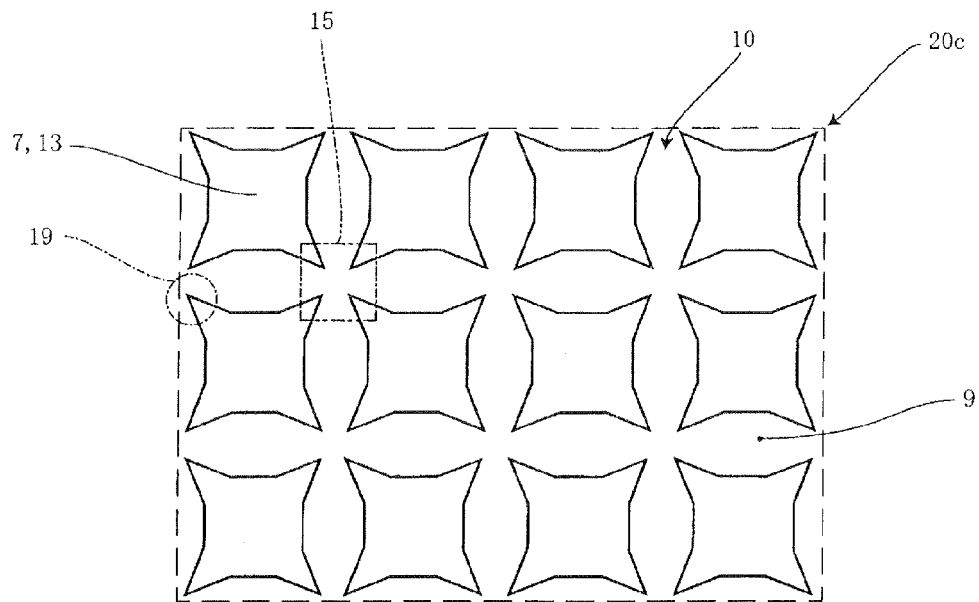
FIG. 7 is an enlarged schematic view showing a portion of a cross-section perpendicular to a direction in which cells of a honeycomb structure constituting still another embodiment of the invention extend.
Figure 8:
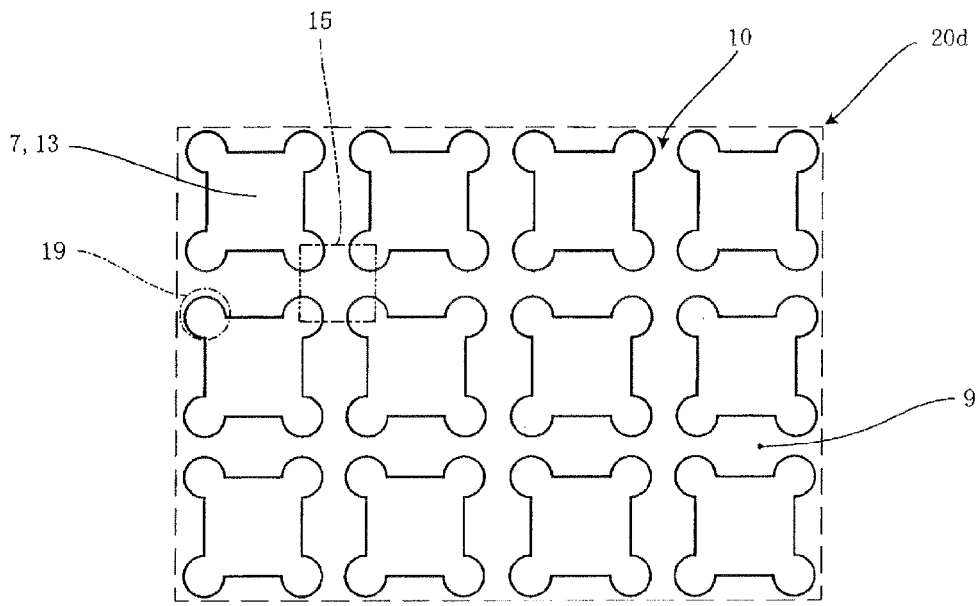
FIG. 8 is an enlarged schematic view showing a portion of a cross-section perpendicular to a direction in which cells of a honeycomb structure constituting still another embodiment of the invention extend.
Figure 9:
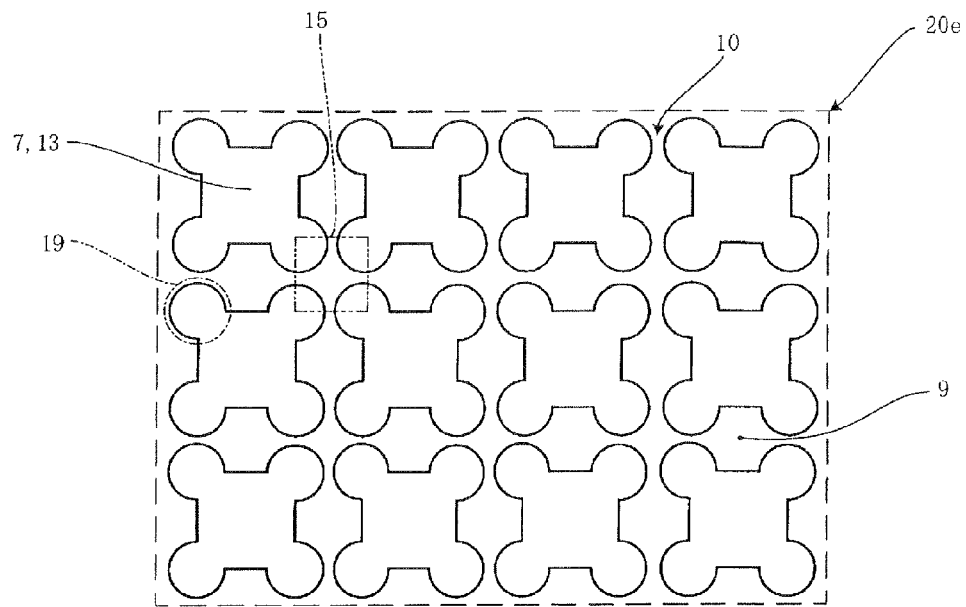
FIG. 9 is an enlarged schematic view showing a portion of a cross-section perpendicular to a direction in which cells of a honeycomb structure constituting still another embodiment of the invention extend.
Figure 10:
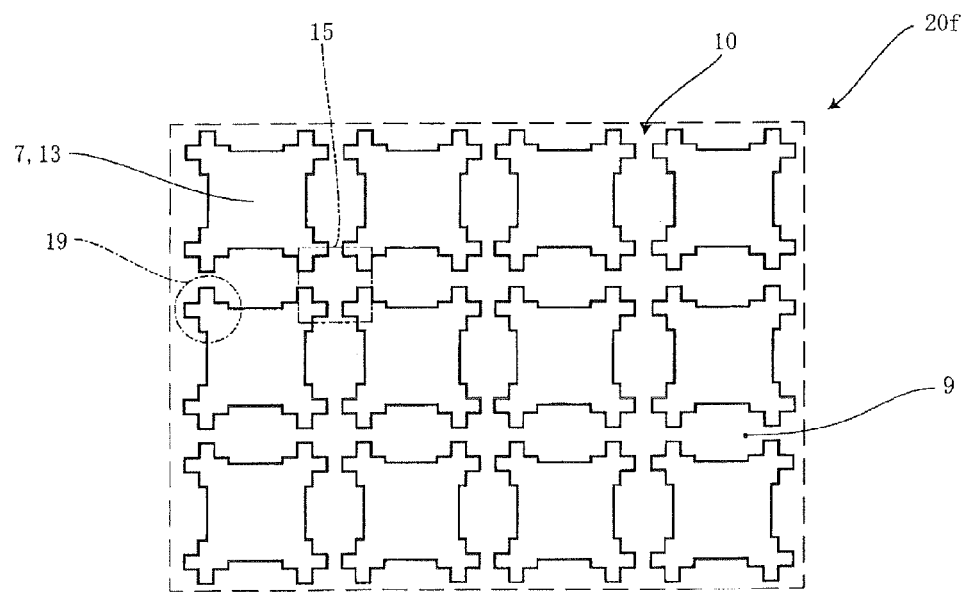
FIG. 10 is an enlarged schematic view showing a portion of a cross-section perpendicular to a direction in which cells of a honeycomb structure constituting still another embodiment of the invention extend.
Figure 11:
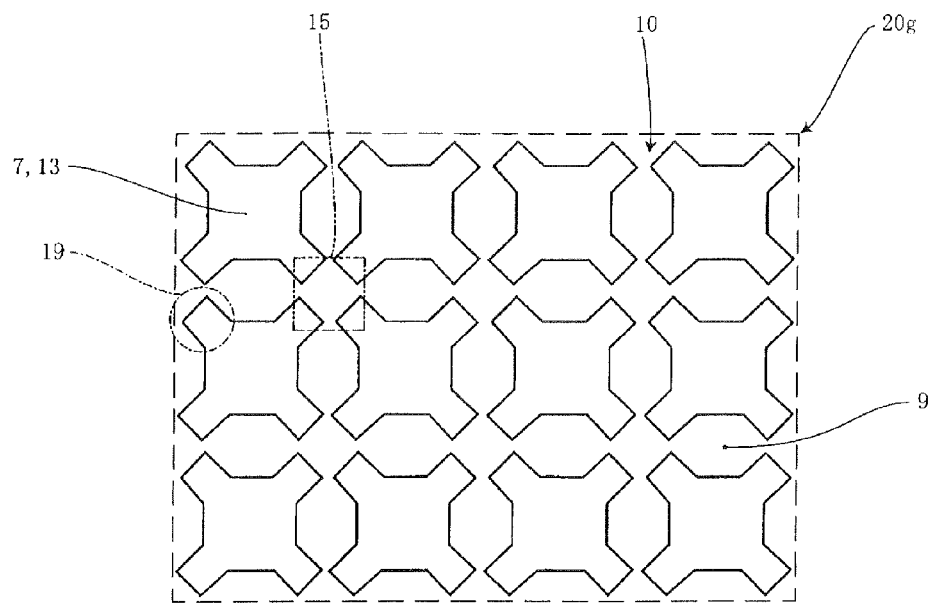
FIG. 11 is an enlarged schematic view showing a portion of a cross-section perpendicular to a direction in which cells of a honeycomb structure constituting still another embodiment of the invention extend.
Figure 12:
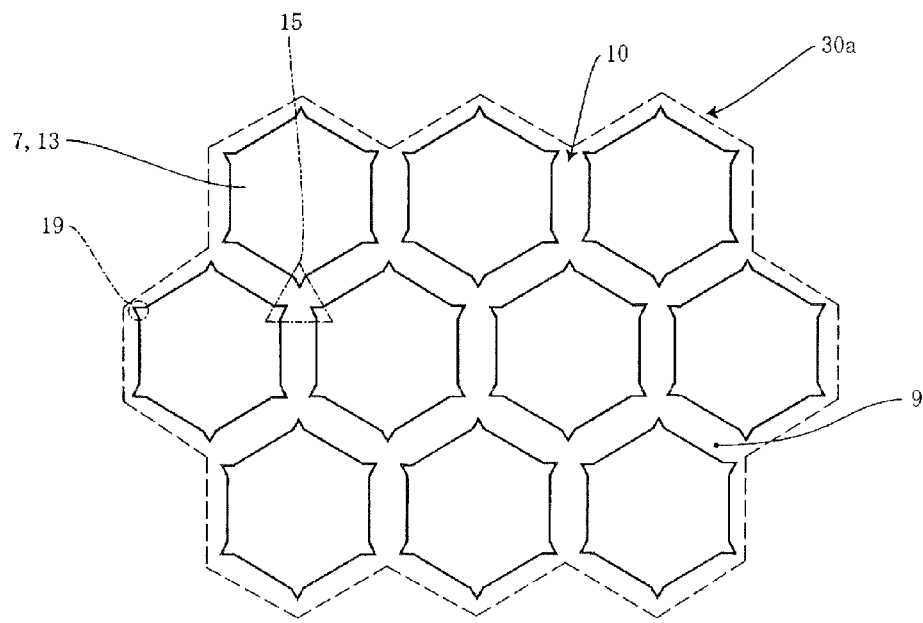
FIG. 12 is an enlarged schematic view showing a portion of a cross-section perpendicular to a direction in which cells of a honeycomb structure constituting still another embodiment of the invention extend.
Figure 13:
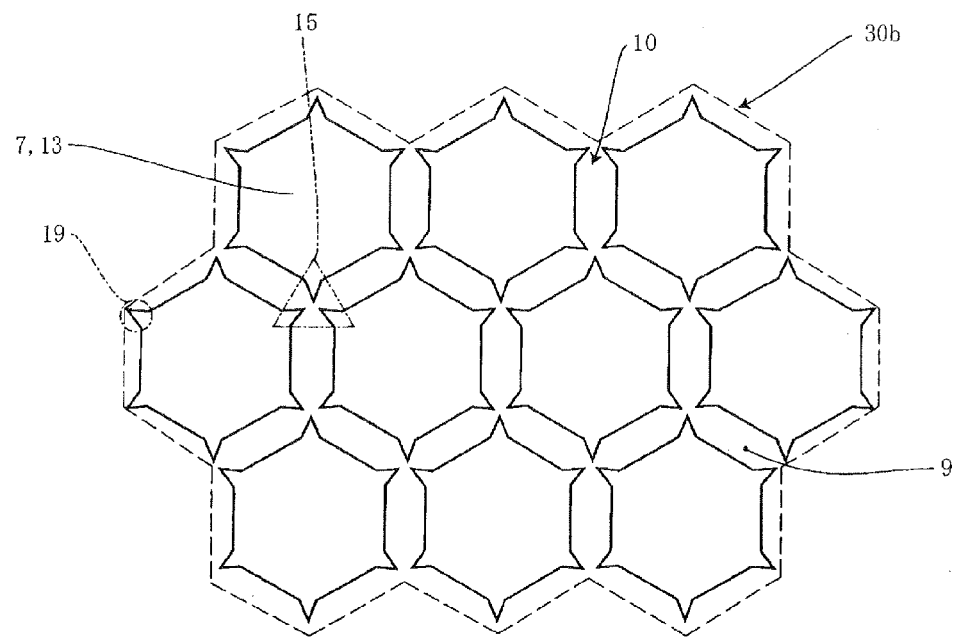
FIG. 13 is an enlarged schematic view showing a portion of a cross-section perpendicular to a direction in which cells of a honeycomb structure constituting still another embodiment of the invention extend.
Figure 14:
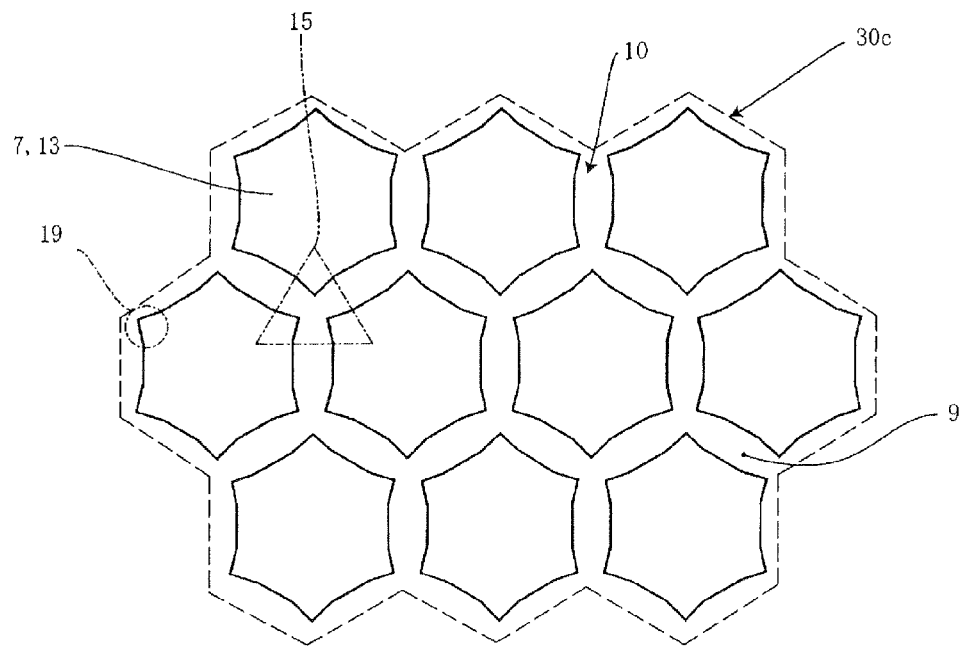
FIG. 14 is an enlarged schematic view showing a portion of a cross-section perpendicular to a direction in which cells of a honeycomb structure constituting still another embodiment of the invention extend.
Figure 15:
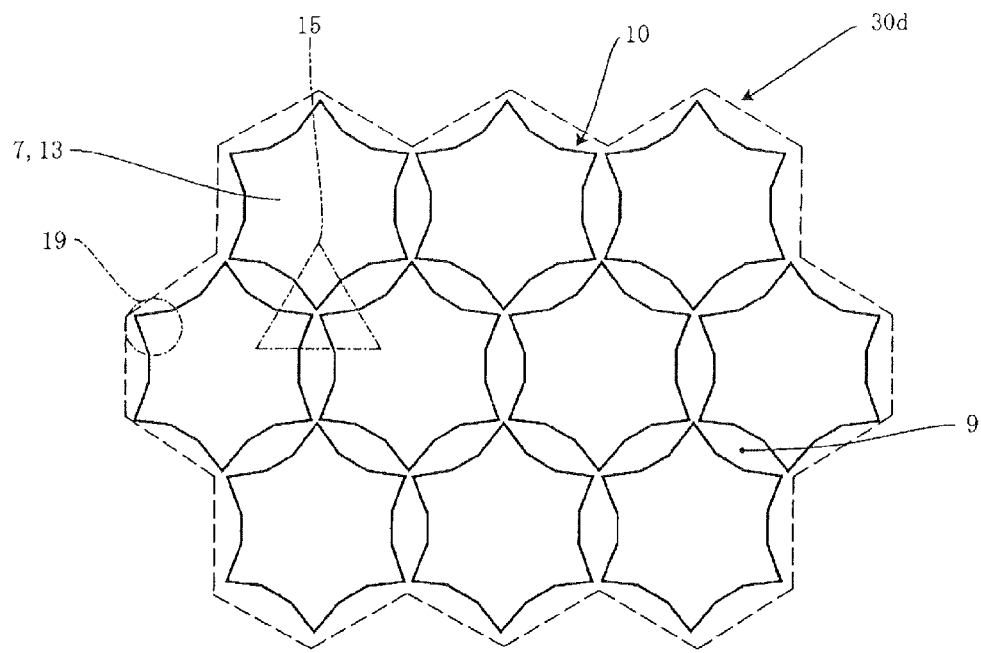
FIG. 15 is an enlarged schematic view showing a portion of a cross-section perpendicular to a direction in which cells of a honeycomb structure constituting still another embodiment of the invention extend.
Figure 16:
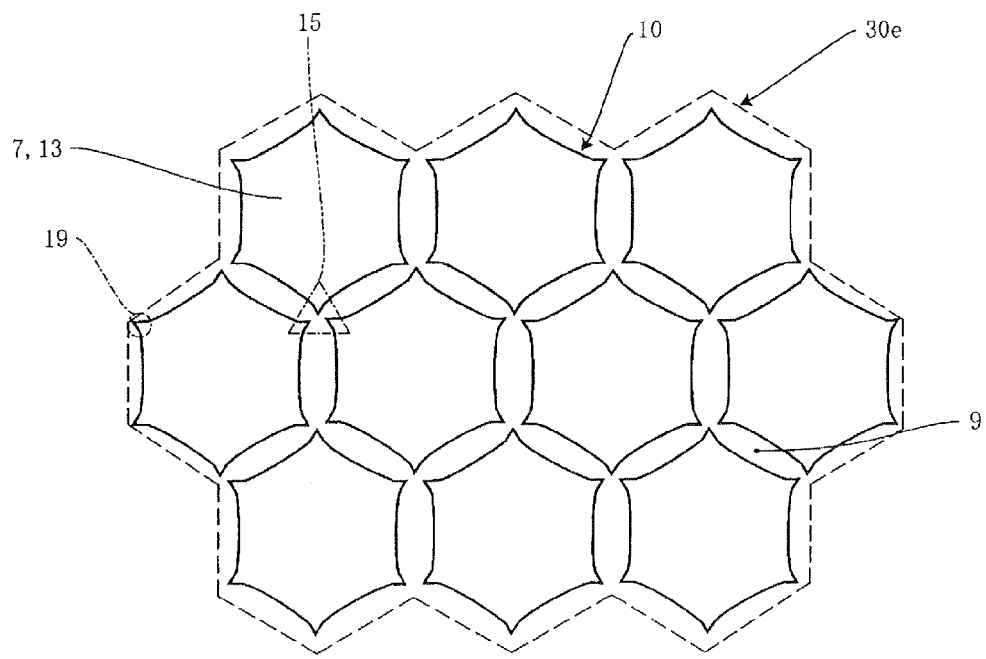
FIG. 16 is an enlarged schematic view showing a portion of a cross-section perpendicular to a direction in which cells of a honeycomb structure constituting still another embodiment of the invention extend.
Figure 17:
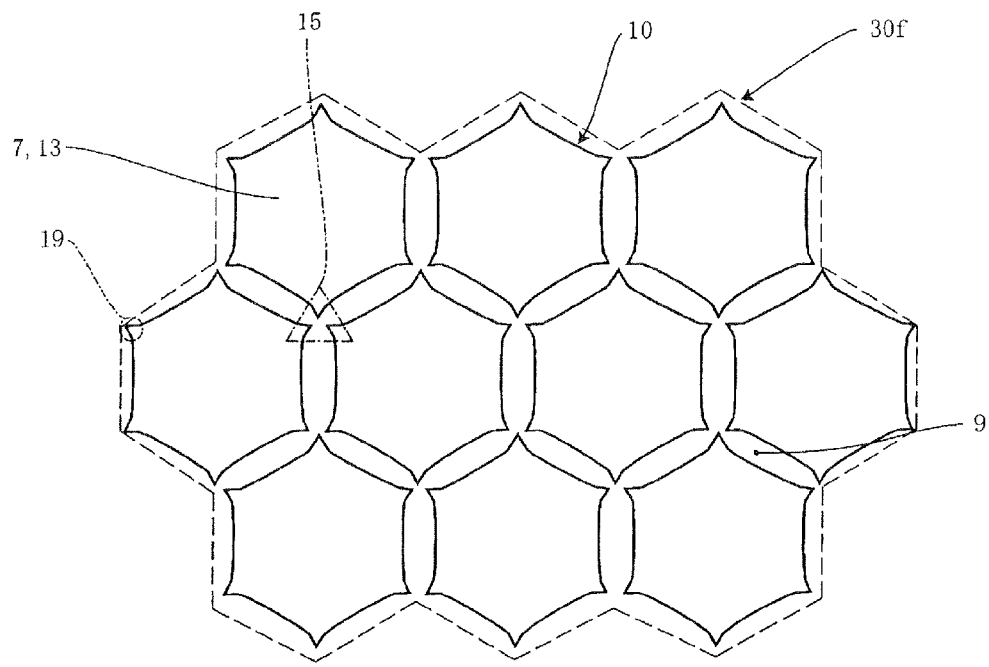
FIG. 17 is an enlarged schematic view showing a portion of a cross-section perpendicular to a direction in which cells of a honeycomb structure constituting still another embodiment of the invention extend.

FIGS. 6 to 11 are enlarged schematic views showing a portion of a cross-section perpendicular to the Z direction of each of honeycomb structures 20b to 20g constituting still another embodiment of the invention. All of the honeycomb structures 20b to 20g correspond to a honeycomb structure in which the partition walls 9 define the complete cells 13 in a substantially quadrangular shape. The shape of each recess portion 19 formed in the intersecting portions 15 may be arbitrary. In the honeycomb structures 20b and 20c, the shape of each recess portion 19 is a shape with bottom portions pointed (FIGS. 6 and 7). In the honeycomb structures 20d and 20e, the shape of each recess portion 19 is a recessed shape which is rounded and bulged (FIGS. 8 and 9). In the honeycomb structure 20f, the shape of each recess portion 19 is a recessed shape with zigzag outlines (FIG. 10). In the honeycomb structure 20g, the shape of each recess portion 19 is a recessed shape which has flat bottom portions and is bulged in a quadrangular shape (FIG. 11). FIGS. 12 to 17 are enlarged schematic views showing a portion of a cross-section perpendicular to the Z direction of each of honeycomb structures 30a to 30f constituting still another embodiment of the invention. All of the honeycomb structures 30a to 30f correspond to a honeycomb structure in which the partition walls 9 define the complete cells 13 in a substantially hexagonal shape. Further, the shape of each recess portion 19 of all the honeycomb structures 30a to 30f is a shape with bottom portions pointed (FIGS. 12 to 17).

Figure 18:
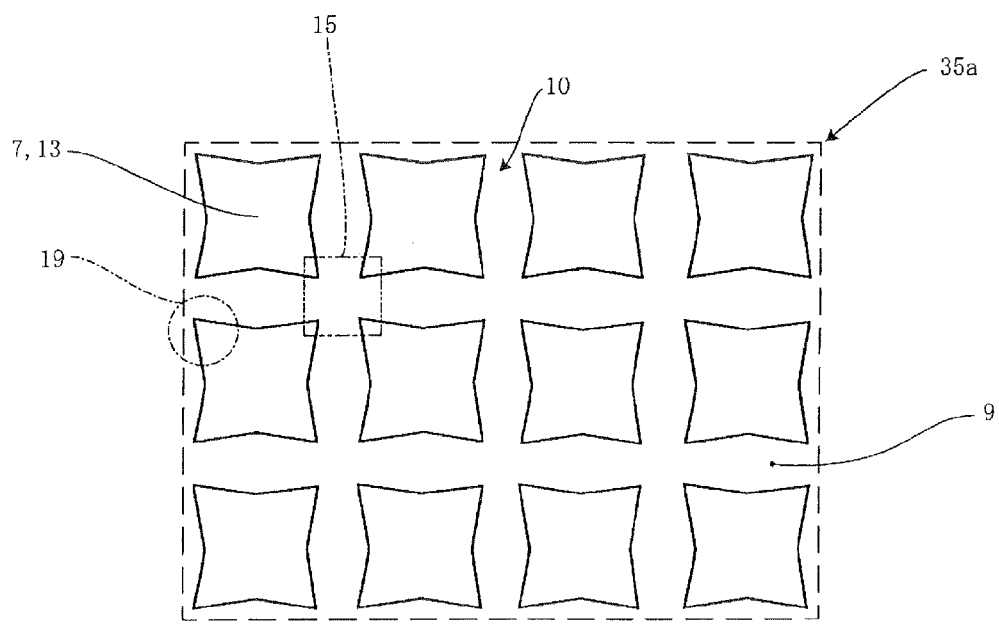
FIG. 18 is an enlarged schematic view showing a portion of a cross-section perpendicular to a direction in which cells of a honeycomb structure constituting still another embodiment of the invention extend.
Figure 19:
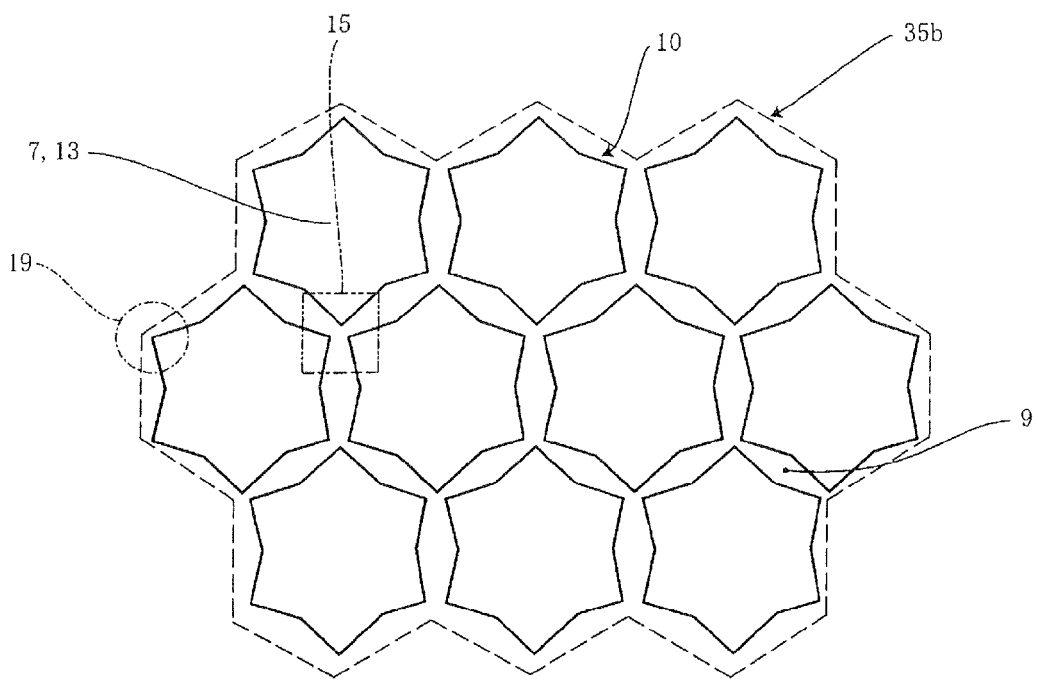
FIG. 19 is an enlarged schematic view showing a portion of a cross-section perpendicular to a direction in which cells of a honeycomb structure constituting still another embodiment of the invention extend.

FIGS. 18 and 19 are enlarged schematic views showing a portion of a cross-section perpendicular to the Z direction of each of honeycomb structures 35a and 35b constituting still another embodiment of the invention. In the honeycomb structures 35a and 35b, the complete cells 13 are not defined by the partition walls 9 having a substantially linear shape.

Hereinafter, "other features" in the honeycomb structure 1 described above will be described. Incidentally, unless otherwise mentioned, the following "other features" can be applied to all embodiments of the honeycomb structure of the invention.

In the honeycomb structure 1, the porosity of the partition walls 9 is generally 20 to 60%. Further, the porosity of the partition walls 9 is preferably 25 to 55%, more preferably 25 to 45%, and particularly, most preferably 25 to 40%. When the porosity of the partition walls 9 is less than 20%, the weight of the honeycomb structure 1 is increased, and further, the heat capacity is increased. When the porosity of the partition walls 9 is more than 60%, the structural strength of the honeycomb structure 1 is decreased. In this specification, "the porosity of the partition walls 9" is a value measured by a mercury porosimeter.

In the honeycomb structure 1, the maximum thickness $X_1$ of the partition wall 9 is generally 0.04 to 0.06 mm, preferably 0.05 to 0.02 mm, more preferably 0.06 to 0.16 mm, and particularly preferably 0.06 to 0.12 mm. When the maximum thickness $X_1$ of the partition wall 9 is 0.04 to 0.06 mm as described above, the heat capacity of the honeycomb structure 1 is decreased, and further, an increase in pressure loss is reduced.

In this specification, "the thickness of each partition wall 9" means the thickness of each partition wall 9 defining two adjacent cells 7 in the cross-section perpendicular to the Z direction. "The thickness of each partition wall 9" can be measured, for example, by an image analysis device (trade name "NEXIV, VMR-1515" manufactured by Nikon Corporation).

In the honeycomb structure 1, the cell density is preferably 15 to 140 cells/cm$^2$, more preferably 30 to 120 cells/cm$^2$, and particularly, most preferably 45 to 95 cells/cm$^2$. When the cell density is less than 15 cells/cm$^2$, the contact area of the exhaust gas and the catalyst is decreased and thus there is a concern that the exhaust gas purification performance may be deteriorated. When the cell density is more than 140 cells/cm$^2$, the pressure loss may be significantly increased in some cases. In this specification, the term "cell density" means the number of cells 7 per unit area (per 1 cm$^2$) in the cross-section perpendicular to the Z direction.

Further, in the honeycomb structure 1, it is preferable that the honeycomb structure body 10 be surrounded by a ceramic raw material containing one or more selected from the group consisting of cordierite, alumina, mullite, silicon nitride, and silicon carbide. Furthermore, it is more preferable that the honeycomb structure body 10 be fainted by a ceramic raw material containing, as a main constituent, one or more selected from the group consisting of cordierite, alumina, mullite, silicon nitride, and silicon carbide. Among these, it is most preferable that the honeycomb structure body 10 be formed by a ceramic raw material containing cordierite as a main constituent. When cordierite is used as the material of the partition wall 9, the honeycomb structure body 10 having a small thermal expansion coefficient and excellent thermal shock resistance is obtained. Incidentally, the term "main constituent" in this specification indicates a constituent which is contained in an amount of 50% by mass or more of the total. For example, "containing cordierite as a main constituent" indicates that the honeycomb structure body 10 contains 50% by mass or more of cordierite.

In the honeycomb structure 1, it is preferable that the circumference of the honeycomb structure body 10 be surrounded by the circumferential wall 11 from the viewpoint of improving the structural strength. The thickness of the circumferential wall 11 is not particularly limited, but is preferably 0.05 to 1 mm. When the thickness of the circumferential wall 11 is set to be within the above range, an increase in pressure loss can be prevented while the structural strength of the honeycomb structure 1 is maintained properly.

In the honeycomb structure 1, the material of the circumferential wall 11 is preferably the same as that of the partition wall 9 (the material of the honeycomb structure body 10), but may be different from that of the partition wall 9.

In the honeycomb structure 1, the shape of the circumferential wall 11 is not particularly limited. The shape of the circumferential wall 11 may be a pillar shape in which a cross-section perpendicular to the Z direction is an ellipse shape or a pillar shape in which a cross-section perpendicular to the Z direction is a polygonal shape such as a quadrangular, pentangular or hexagonal shape, in addition to the round pillar shape as shown in FIG. 1.

Figure 20:
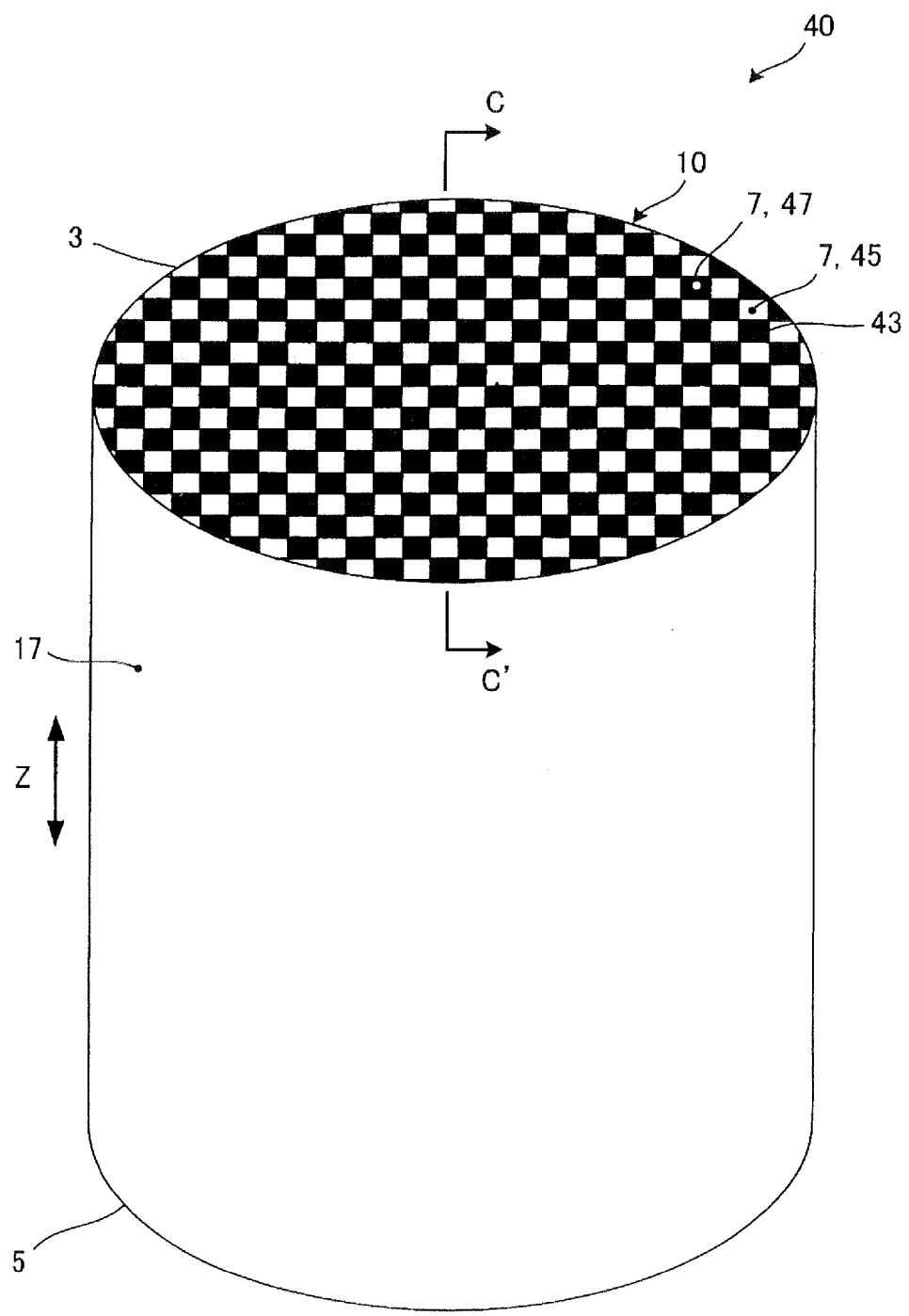
FIG. 20 is a schematic perspective view of a honeycomb structure constituting still another embodiment of the invention.
Figure 21:
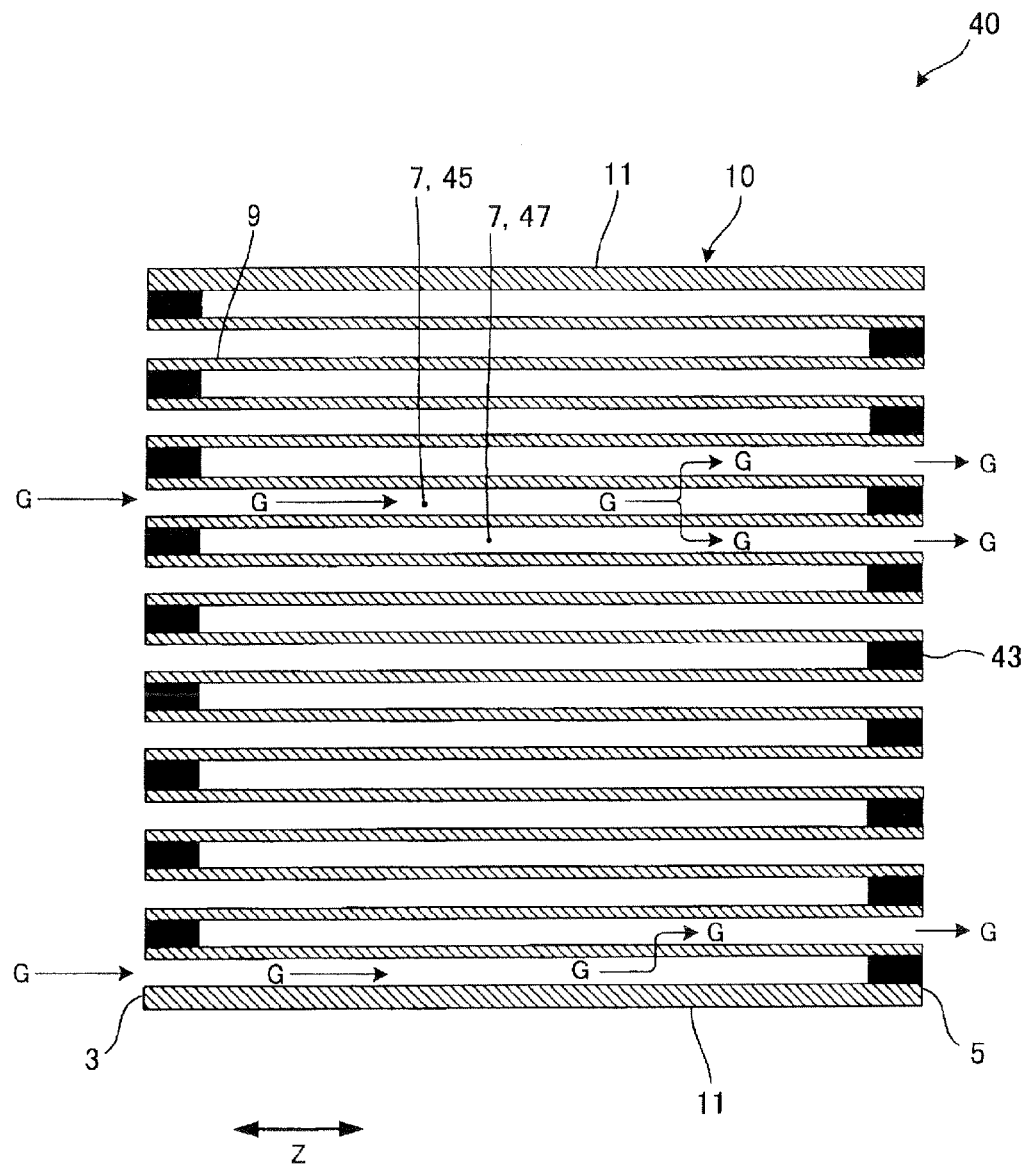
FIG. 21 is a schematic view of the C-C' cross-section of FIG. 20.

FIG. 20 is a schematic perspective view of a honeycomb structure 40 constituting still another embodiment of the invention. FIG. 21 is a schematic view of the C-C' cross-section of FIG. 20. The honeycomb structure 40 corresponds to a modification example of the honeycomb structure 1 described above. That is, the honeycomb structure 40 has the same configuration of the honeycomb structure body 10 as that of the honeycomb structure 1. The honeycomb structure 40 includes the honeycomb structure body 10 and plugging portions 43. The plugging portions 43 plug open ends at the second end face 5 side of first cells 45 that are predetermined cells 7 among the plurality of cells 7 and open ends at the first end face 3 side of second cells 47 that are residual cells 7 among the plurality of cells 7.

In the honeycomb structure 40, the ends at the second end face 5 sides of the first cells 45 are dead-ended by the plugging portions 43. For this reason, when an exhaust gas G flows into the first cells 45 from the first end faces 3, the exhaust gas G passes through the porous partition walls 9 to move from the first cells 45 to the second cells 47. When the exhaust gas G passes through the partition walls 9 in this way, particulate matters contained in the exhaust gas G are trapped by the partition walls 9. Therefore, when the honeycomb structure 40 is used, it is possible to reduce the particulate matters in the exhaust gas G. Further, in a case where the catalyst 17 is loaded on the partition walls 9 of the honeycomb structure 40, reducing of harmful substances such as carbon monoxide (CO), hydrocarbon (HC), and nitrogen oxide (NO$_X$) and reducing of particulate matters in the exhaust gas G can be concurrently performed.

2. Production Method of Honeycomb Structure:

Next, the method for producing a honeycomb structure of this embodiment will be described. In the production method of this embodiment, a honeycomb structure is obtained by subsequently performing a preparation step of a kneaded material, a forming step, and a firing step. The preparation step of a kneaded material is a step of mixing and kneading forming raw materials containing a ceramic raw material to obtain a kneaded material. The forming step is a step of extruding the kneaded material obtained by the preparation step of a kneaded material into a honeycomb shape to obtain a honeycomb formed body having a plurality of cells formed therein. The firing step is a step of firing the honeycomb formed body to obtain a honeycomb structure.

2-1. Preparation Step of Kneaded Material:

In the preparation step of a kneaded material, a kneaded material is obtained by mixing and kneading forming raw materials containing a ceramic raw material.

As the ceramic raw material, it is preferable to use at least one selected from the group consisting of a cordierite forming raw material, silicon carbide, a silicon-silicon carbide composite material, mullite, alumina, spinel, a silicon carbide-cordierite composite material, lithium aluminum silicate, and aluminum titanate. Among the ceramic raw materials exemplified herein, a cordierite forming raw material, silicon carbide, and a silicon-silicon carbide composite material are preferable. When a cordierite forming raw material is used, a honeycomb structure having a small thermal expansion coefficient and excellent thermal shock resistance can be obtained. Further, when silicon carbide or a silicon-silicon carbide composite material is used as a ceramic raw material, a honeycomb structure having excellent thermal shock resistance can be obtained. Incidentally, the "silicon-silicon carbide composite material" is a composite material formed by using silicon carbide (SiC) as an aggregate and silicon (Si) as a bonding agent. The "cordierite forming raw material" is a ceramic raw material in which constituents are compounded so as to have a chemical composition of 42 to 56% by mass of silica, 30 to 45% by mass of alumina, and 12 to 16% by mass of magnesia, and becomes cordierite upon firing.

In the production method of this embodiment, the foaming raw material may contain a pore former, a dispersing medium or an additive in addition to a ceramic raw material.

As the dispersing medium, for example, water or the like can be exemplified. As the additive, an organic binder, a surfactant, or the like can be exemplified. The content of the dispersing medium is preferably 30 to 150 parts by mass with respect to 100 parts by mass of the ceramic raw material.

Examples of the organic binder can include methylcellulose, hydroxypropoxyl cellulose, hydroxyethyl cellulose, carboxymethylcellulose, and polyvinyl alcohol. Among these, methylcellulose and hydroxypropoxyl cellulose are preferably used together. The content of the organic binder is preferably 1 to 10 parts by mass with respect to 100 parts by mass of the ceramic raw material.

As the surfactant, ethylene glycol, dextrin, fatty acid soap, polyalcohol, or the like can be used. These surfactants may be used alone or in combination of two or more kinds. The content of the surfactant is preferably 0.1 to 5.0 parts by mass with respect to 100 parts by mass of the ceramic raw material.

In the preparation step of a kneaded material, a method of kneading a forming raw material to form a kneaded material is not particularly limited, but examples of the method can include methods using a kneader, a vacuum pugmill, and the like.

2-2. Forming Step:

In the forming step, a honeycomb formed body is obtained by extruding the kneaded material obtained in the preparation step of a kneaded material into a honeycomb shape. A plurality of cells passing through the honeycomb formed body are formed in this honeycomb formed body. The extrusion can be carried out by using a die. Regarding a die, a slit shape (from a different perspective, a shape of a pin surrounded by the slit), a slit width, a pin density, and the like may be appropriately designed to correspond to a cell shape in the honeycomb formed body, a shape of the intersecting portion of the partition walls (for example, a shape of the recess portion of the intersecting portion), a thickness of the partition wall, and a cell density. As a material of the die, cemented carbide which does not easily wear is preferable.

2-3. Firing Step:

In the firing step, the honeycomb formed body obtained in the forming step described above is fired to obtain a honeycomb structure. The honeycomb structure thus obtained includes partition walls defining a plurality of cells each to function as a through channel for fluid. Further, when a pore former is included in the forming raw material described above, the partition walls become porous partition walls in which an enormous number of pores are formed.

In the firing step of the production method of this embodiment, a firing temperature can be appropriately determined depending on the material of the honeycomb formed body. For example, when the main constituent of the honeycomb formed body is a cordierite forming raw material, the highest temperature during firing is preferably 1380 to 1450° C. and more preferably 1400 to 1440° C. Further, time at the highest temperature during firing is preferably about 3 to 10 hours.

In the production method of this embodiment, the honeycomb formed body may be dried before the honeycomb formed body is fired. The drying method is not particularly limited, but examples thereof can include hot air drying, microwave drying, dielectric drying, reduced-pressure drying, vacuum drying, and freeze drying. Among these, dielectric drying, microwave drying, or hot air drying is preferably performed alone or as a combination thereof.

2-4. Plugging Step:

When the honeycomb structure including plugging portions is prepared, it is preferable to employ a plugging step. In the plugging step, plugging portions are formed by filling a plugging material into ends at the second end face side of the first cells and ends at the first end face side of the residual second cells of the honeycomb structure.

When the plugging material is filled into the honeycomb structure, for example, first, the plugging material is filled into the end at the first end face side, and then the plugging material is filled into the end at the second end face side. As a method of filling the plugging material into the ends, a method including a masking step and a press-in step to be described below can be exemplified. The masking step is a step of attaching a sheet to one end face (for example, the first end face) of the honeycomb structure, and forming holes at positions of the sheet which overlap with "cells to be provided with the plugging portions." The press-in step is a step of pressing "an end of the honeycomb structure to which the sheet is attached" into a container which stores the plugging material, to press the plugging material into the cells of the honeycomb structure through the holes formed in the sheet. When the plugging material is pressed into the cells of the honeycomb structure, the plugging material passes through the holes formed in the sheet and is filled into the only cells that communicate with the holes formed in the sheet.

Next, the plugging material filled into the honeycomb structure is dried to form plugging portions, thereby obtaining a honeycomb structure provided with the plugging portions, that is, a honeycomb filter.

Incidentally, the plugging material may be dried after the plugging material is filled into both end of the honeycomb structure, or the plugging material may be dried in such a manner that, after the plugging material filled into one end of the honeycomb structure is dried, the plugging material is filled into the other end and then the plugging material filled into the other end is dried. Further, the plugging material may also be fired for the purpose of being more reliably immobilized.

Further, the plugging material is filled into the honeycomb formed body before drying or the honeycomb formed body after drying (a honeycomb dried body), and then the plugging material may be fired together with the honeycomb formed body before drying or the honeycomb dried body.

EXAMPLE

Hereinafter, the invention will be described in more detail based on examples, but the invention is not limited to these examples.

Comparative Example 1

As the cordierite forming raw material, alumina, aluminum hydroxide, kaolin, talc, and silica were used. To 100 parts by mass of the cordierite forming raw material, 5 parts by mass of the pore former, 85 parts by mass of water (the dispersing medium), 8 parts by mass of water absorbable hydroxypropyl methylcellulose (the organic binder), and 3 parts by mass of a surfactant were added. After the cordierite forming raw material was prepared, mixing was performed, and further, kneading was performed to obtain a kneaded material.

Next, the kneaded material was subjected to extrusion using a predetermined die to obtain a honeycomb formed body. The whole shape of the honeycomb formed body was a round pillar shape. Then, the obtained honeycomb formed body was dried by a microwave drier. Thereafter, further, the honeycomb formed body was completely dried by a hot air drier. Subsequently, both end faces of the dried honeycomb formed body were cut into a predetermined dimension.

The honeycomb fanned body thus obtained was further fired at 1410 to 1440° C. for 5 hours to obtain a honeycomb structure.

The obtained honeycomb structure had a diameter in the cross-section perpendicular to the Z direction of 143.8 mm and a length in the Z direction of 152.4 mm. Each condition in the honeycomb structure is shown in Table 1.

A three-way catalyst was loaded on the partition walls of the honeycomb structure to obtain a honeycomb catalytic body. The coating amount of the three-way catalyst was set to 100 g/L. A method of loading the three-way catalyst is a dipping method. Incidentally, in the section "Example," the "honeycomb structure" means a honeycomb structure before the catalyst is loaded, and the "honeycomb catalytic body" means a honeycomb structure after the catalyst is loaded.

Examples 1 to 3 and Comparative Example 2

Honeycomb structures of Examples 1 to 3 and Comparative Example 2 were prepared in the same manner as in Comparative Example 1, except that each condition was changed to be each condition shown in Table 1. At the time of preparing a honeycomb catalytic body, an amount of the catalyst was adjusted such that pressure loss of the honeycomb catalytic body had the same value as the pressure loss of the honeycomb catalytic body of Comparative Example 1, and then the catalyst was loaded on the partition walls. Incidentally, for convenience of explanation, the honeycomb catalytic body that is a reference used for adjustment of an amount of the catalyst like the honeycomb catalytic body of Comparative Example 1 is referred to as a "reference honeycomb catalytic body," and the honeycomb catalytic body, in which an amount of the catalyst is adjusted based on a value of pressure loss of the reference honeycomb catalytic body, like the honeycomb catalytic bodies of Examples 1 to 3 and Comparative Example 2, is referred to as a "contrast honeycomb catalytic body." For example, each of the honeycomb catalytic bodies of Examples 1 to 3 and Comparative Example 2 is assumed to be the "contrast honeycomb catalytic body when Comparative Example 1 is considered as a reference" (in Table 1, denoted as "Contrast (Comparative Example 1)" in the section of Type, and regarding other Examples and Comparative Examples, the same is also applied in Table).

Examples 4 to 81 and Comparative Examples 3 to 46

Honeycomb structures and honeycomb catalytic bodies were prepared in the same manner as in Comparative Example 1 in the case of the reference honeycomb catalytic body and as in Example 1 in the case of the contrast honeycomb catalytic body, except that each condition was changed to be each condition shown in Tables 1 to 6. Incidentally, regarding a case where "a proportion of the set of intersecting portions having the $X_2/X_1$ ratio of 0.1 to 0.8%" was less than 100%, a value of the "$X_2/X_1$ ratio" in "the set of intersecting portions having the $X_2/X_1$ ratio of 0.1 to 0.8%" was a value each shown in Tables 1 to 6, and a value of the "$X_2/X_1$ ratio" in the set of the residual intersecting portions was 1.0.

TABLE 1

| | Defining of complete cell | Cell density (cell/cm$^2$) | Porosity (%) | Cell pitch $X_1$ (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Comp. Ex 1 | Substantially hexagonal shape | 62.0 | 35 | 1.27 | 0.11 | 0.11 | 1.00 | 0.00 | Reference | 100 | 0 | Reference | OK |
| Example 1 | Substantially hexagonal shape | 62.0 | 35 | 1.27 | 0.11 | 0.02 | 0.18 | 100.00 | Contrast (Comp. Ex 1) | 157 | 57 | A | OK |

TABLE 1-continued

| | Defining of complete cell | Cell density (cell/cm$^2$) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Example 2 | Substantially hexagonal shape | 62.0 | 35 | 1.27 | 0.11 | 0.03 | 0.27 | 100.00 | Contrast (Comp. Ex 1) | 156 | 56 | A | OK |
| Example 3 | Substantially hexagonal shape | 62.0 | 35 | 1.27 | 0.11 | 0.06 | 0.55 | 100.00 | Contrast (Comp. Ex 1) | 142 | 42 | B | OK |
| Comp. Ex 2 | Substantially hexagonal shape | 62.0 | 35 | 1.27 | 0.11 | 0.09 | 0.82 | 0.00 | Contrast (Comp. Ex 1) | 119 | 19 | D | OK |
| Comp. Ex 3 | Substantially hexagonal shape | 62.0 | 35 | 1.27 | 0.11 | 0.11 | 1.00 | 0.00 | Reference | 200 | 0 | Reference | OK |
| Example 4 | Substantially hexagonal shape | 62.0 | 35 | 1.27 | 0.11 | 0.02 | 0.18 | 100.00 | Contrast (Comp. Ex 3) | 256 | 56 | A | OK |
| Example 5 | Substantially hexagonal shape | 62.0 | 35 | 1.27 | 0.11 | 0.03 | 0.27 | 100.00 | Contrast (Comp. Ex 3) | 252 | 52 | A | OK |
| Example 6 | Substantially hexagonal shape | 62.0 | 35 | 1.27 | 0.11 | 0.06 | 0.55 | 100.00 | Contrast (Comp. Ex 3) | 234 | 34 | B | OK |
| Comp. Ex 4 | Substantially hexagonal shape | 62.0 | 35 | 1.27 | 0.11 | 0.09 | 0.82 | 0.00 | Contrast (Comp. Ex 3) | 217 | 17 | D | OK |
| Example 7 | Substantially hexagonal shape | 62.0 | 35 | 1.27 | 0.11 | 0.03 | 0.27 | 80,00 | Contrast (Comp. Ex 3) | 242 | 42 | A | OK |
| Example 8 | Substantially hexagonal shape | 62.0 | 35 | 1.27 | 0.11 | 0.03 | 0.27 | 60.00 | Contrast (Comp. Ex 3) | 231 | 31 | B | OK |
| Example 9 | Substantially hexagonal shape | 62.0 | 35 | 1.27 | 0.11 | 0.03 | 0.27 | 30.00 | Contrast (Comp. Ex 3) | 216 | 16 | C | OK |
| Example 10 | Substantially hexagonal shape | 62.0 | 35 | 1.27 | 0.11 | 0.03 | 0.27 | 12.00 | Contrast (Comp. Ex 3) | 206 | 6 | C | OK |
| Comparative Example 5 | Substantially hexagonal shape | 62.0 | 35 | 1.27 | 0.11 | 0.03 | 0.27 | 8.00 | Contrast (Comp. Ex 3) | 204 | 4 | D | OK |
| Comp. Ex 6 | Substantially hexagonal shape | 62.0 | 35 | 1.27 | 0.11 | 0.03 | 0.27 | 3.00 | Contrast (Comp. Ex 3) | 202 | 2 | D | OK |
| Comp. Ex 7 | Substantially hexagonal shape | 62.0 | 35 | 1.27 | 0.11 | 0.11 | 1.00 | 0.00 | Reference | 300 | 0 | Reference | OK |
| Example 11 | Substantially hexagonal shape | 62.0 | 35 | 1.27 | 0.11 | 0.02 | 0.18 | 100.00 | Contrast (Comp. Ex 7) | 370 | 70 | A | OK |
| Example 12 | Substantially hexagonal shape | 62.0 | 35 | 1.27 | 0.11 | 0.03 | 0.27 | 100.00 | Contrast (Comp. Ex 7) | 359 | 59 | A | OK |
| Example 13 | Substantially hexagonal shape | 62.0 | 35 | 1.27 | 0.11 | 0.06 | 0.55 | 100.00 | Contrast (Comp. Ex 7) | 339 | 39 | B | OK |
| Comp. Ex 8 | Substantially hexagonal shape | 62.0 | 35 | 1.27 | 0.11 | 0.09 | 0.82 | 0.00 | Contrast (Comp. Ex 7) | 319 | 19 | D | OK |
| Comp. Ex 9 | Substantially hexagonal shape | 62.0 | 35 | 1.27 | 0.11 | 0.11 | 1.00 | 0.00 | Reference | 400 | 0 | Reference | OK |
| Example 14 | Substantially hexagonal shape | 62.0 | 35 | 1.27 | 0.11 | 0.02 | 0.18 | 100.00 | Contrast (Comp. Ex 9) | 464 | 64 | A | OK |
| Example 15 | Substantially hexagonal shape | 62.0 | 35 | 1.27 | 0.11 | 0.03 | 0.27 | 100.00 | Contrast (Comp. Ex 9) | 460 | 60 | A | OK |
| Example 16 | Substantially hexagonal shape | 62.0 | 35 | 1.27 | 0.11 | 0.06 | 0.55 | 100.00 | Contrast (Comp. Ex 9) | 440 | 40 | B | OK |
| Comp. Ex 10 | Substantially hexagonal shape | 62.0 | 35 | 1.27 | 0.11 | 0.09 | 0.82 | 0.00 | Contrast (Comp. Ex 9) | 413 | 13 | D | OK |

| | Defining of complete cell | Cell density (cell/cm$^2$) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Comp. Ex 11 | Substantially hexagonal shape | 139.5 | 27 | 0.91 | 0.064 | 0.064 | 1.00 | 0.00 | Reference | 100 | 0 | Reference | OK |
| Comp. Ex 12 | Substantially hexagonal shape | 139.5 | 27 | 0.91 | 0.064 | 0.005 | 0.08 | 0.00 | Contrast (Comp. Ex 11) | 156 | 56 | A | NG |
| Example 17 | Substantially hexagonal shape | 139.5 | 27 | 0.91 | 0.064 | 0.01 | 0.16 | 100.00 | Contrast Comp. Ex 11) | 156 | 56 | A | OK |

-continued

| | Defining of complete cell | Cell density (cell/cm²) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Example 18 | Substantially hexagonal shape | 139.5 | 27 | 0.91 | 0.064 | 0.04 | 0.63 | 100.00 | Contrast (Comp. Ex 11) | 128 | 28 | C | OK |
| Example 19 | Substantially hexagonal shape | 139.5 | 27 | 0.91 | 0.064 | 0.05 | 0.78 | 100.00 | Contrast Comp. Ex 11) | 121 | 21 | C | OK |
| Comp. Ex 13 | Substantially hexagonal shape | 139.5 | 27 | 0.91 | 0.064 | 0.064 | 1.00 | 0.00 | Reference | 200 | 0 | Reference | OK |
| Comp. Ex 14 | Substantially hexagonal shape | 139.5 | 27 | 0.91 | 0.064 | 0.005 | 0.08 | 0.00 | Contrast (Comp. Ex 13) | 263 | 63 | A | NG |
| Example 20 | Substantially hexagonal shape | 139.5 | 27 | 0.91 | 0.064 | 0.01 | 0.16 | 100.00 | Contrast (Comp. Ex 13) | 257 | 57 | A | OK |
| Example 21 | Substantially hexagonal shape | 139.5 | 27 | 0.91 | 0.064 | 0.04 | 0.63 | 100.00 | Contrast (Comp. Ex 13) | 231 | 31 | B | OK |
| Example 22 | Substantially hexagonal shape | 139.5 | 27 | 0.91 | 0.064 | 0.05 | 0.78 | 100.00 | Contrast (Comp. Ex 13) | 219 | 19 | C | OK |
| Comp. Ex 15 | Substantially hexagonal shape | 139.5 | 27 | 0.91 | 0.064 | 0.064 | 1.00 | 0.00 | Reference | 300 | 0 | Reference | OK |
| Comp. Ex 16 | Substantially hexagonal shape | 139.5 | 27 | 0.91 | 0.064 | 0.005 | 0.08 | 0.00 | Contrast (Comp. Ex 15) | 366 | 66 | A | NG |
| Example 23 | Substantially hexagonal shape | 139.5 | 27 | 0.91 | 0.064 | 0.01 | 0.16 | 100.00 | Contrast (Comp. Ex 15) | 361 | 61 | A | OK |
| Example 24 | Substantially hexagonal shape | 139.5 | 27 | 0.91 | 0.064 | 0.04 | 0.63 | 100.00 | Contrast (Comp. Ex 15) | 327 | 27 | B | OK |
| Example 25 | Substantially hexagonal shape | 139.5 | 27 | 0.91 | 0.064 | 0.05 | 0.78 | 100.00 | Contrast (Comp. Ex 15) | 316 | 16 | C | OK |
| Comp. Ex 17 | Substantially hexagonal shape | 139.5 | 27 | 0.91 | 0.064 | 0.064 | 1.00 | 0.00 | Reference | 400 | 0 | Reference | OK |
| Comp. Ex 18 | Substantially hexagonal shape | 139.5 | 27 | 0.91 | 0.064 | 0.005 | 0.08 | 0.00 | Contrast (Comp. Ex 17) | 458 | 58 | A | NG |
| Example 26 | Substantially hexagonal shape | 139.5 | 27 | 0.91 | 0.064 | 0.01 | 0.16 | 100.00 | Contrast (Comp. Ex 17) | 453 | 53 | A | OK |
| Example 27 | Substantially hexagonal shape | 139.5 | 27 | 0.91 | 0.064 | 0.04 | 0.63 | 100.00 | Contrast (Comp. Ex 17) | 426 | 26 | B | OK |
| Example 28 | Substantially hexagonal shape | 139.5 | 27 | 0.91 | 0.064 | 0.05 | 0.78 | 100.00 | Contrast (Comp. Ex 17) | 418 | 18 | C | OK |

TABLE 3

| | Defining of complete cell | Cell density (cell/cm²) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Comp. Ex 19 | Substantially hexagonal shape | 31.0 | 35 | 1.93 | 0.127 | 0.127 | 1.00 | 0.00 | Reference | 100 | 0 | Reference | OK |
| Comp. Ex 20 | Substantially hexagonal shape | 31.0 | 35 | 1.93 | 0.127 | 0.006 | 0.05 | 0.00 | Contrast (Comp. Ex 19) | 148 | 48 | A | NG |
| Example 29 | Substantially hexagonal shape | 31.0 | 35 | 1.93 | 0.127 | 0.02 | 0.16 | 100.00 | Contrast (Comp. Ex 19) | 145 | 45 | A | OK |

TABLE 3-continued

| | Defining of complete cell | Cell density (cell/cm²) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Comp. Ex 19 | Substantially hexagonal shape | 31.0 | 35 | 1.93 | 0.127 | 0.127 | 1.00 | 0.00 | Reference | 100 | 0 | Reference | OK |
| Comp. Ex 20 | Substantially hexagonal shape | 31.0 | 35 | 1.93 | 0.127 | 0.006 | 0.05 | 0.00 | Contrast (Comp. Ex 19) | 148 | 48 | A | NG |
| Example 29 | Substantially hexagonal shape | 31.0 | 35 | 1.93 | 0.127 | 0.02 | 0.16 | 100.00 | Contrast (Comp. Ex 19) | 145 | 45 | A | OK |
| Example 30 | Substantially hexagonal shape | 31.0 | 35 | 1.93 | 0.127 | 0.06 | 0.47 | 100.00 | Contrast (Comp. Ex 19) | 134 | 34 | B | OK |
| Example 31 | Substantially hexagonal shape | 31.0 | 35 | 1.93 | 0.127 | 0.1 | 0.79 | 100.00 | Contrast (Comp. Ex 19) | 117 | 17 | C | OK |
| Comp. Ex 21 | Substantially hexagonal shape | 31.0 | 35 | 1.93 | 0.127 | 0.127 | 1.00 | 0.00 | Reference | 200 | 0 | Reference | OK |
| Comp. Ex 22 | Substantially hexagonal shape | 31.0 | 35 | 1.93 | 0.127 | 0.006 | 0.05 | 0.00 | Contrast (Comp. Ex 21) | 261 | 61 | A | NG |
| Example 32 | Substantially hexagonal shape | 31.0 | 35 | 1.93 | 0.127 | 0.02 | 0.16 | 100.00 | Contrast (Comp. Ex 21) | 255 | 55 | A | OK |
| Example 33 | Substantially hexagonal shape | 31.0 | 35 | 1.93 | 0.127 | 0.06 | 0.47 | 100.00 | Contrast (Comp. Ex 21) | 239 | 39 | B | OK |
| Example 34 | Substantially hexagonal shape | 31.0 | 35 | 1.93 | 0.127 | 0.1 | 0.79 | 100.00 | Contrast (Comp. Ex 21) | 216 | 16 | C | OK |
| Comp. Ex 23 | Substantially hexagonal shape | 31.0 | 35 | 1.93 | 0.127 | 0.127 | 1.00 | 0.00 | Reference | 300 | 0 | Reference | OK |
| Comp. Ex 24 | Substantially hexagonal shape | 31.0 | 35 | 1.93 | 0.127 | 0.006 | 0.05 | 0.00 | Contrast (Comp. Ex 23) | 365 | 65 | A | NG |
| Example 35 | Substantially hexagonal shape | 31.0 | 35 | 1.93 | 0.127 | 0.02 | 0.16 | 100.00 | Contrast (Comp. Ex 23) | 356 | 56 | A | OK |
| Example 36 | Substantially hexagonal shape | 31.0 | 35 | 1.93 | 0.127 | 0.06 | 0.47 | 100.00 | Contrast (Comp. Ex 23) | 338 | 38 | B | OK |
| Example 37 | Substantially hexagonal shape | 31.0 | 35 | 1.93 | 0.127 | 0.1 | 0.79 | 100.00 | Contrast (Comp. Ex 23) | 315 | 15 | C | OK |
| Comp. Ex 25 | Substantially hexagonal shape | 31.0 | 35 | 1.93 | 0.127 | 0.127 | 1.00 | 0.00 | Reference | 400 | 0 | Reference | OK |
| Comp. Ex 26 | Substantially hexagonal shape | 31.0 | 35 | 1.93 | 0.127 | 0.006 | 0.05 | 0.00 | Contrast (Comp. Ex 25) | 463 | 63 | A | NG |
| Example 38 | Substantially hexagonal shape | 31.0 | 35 | 1.93 | 0.127 | 0.02 | 0.16 | 100.00 | Contrast (Comp. Ex 25) | 455 | 55 | A | OK |
| Example 39 | Substantially hexagonal shape | 31.0 | 35 | 1.93 | 0.127 | 0.06 | 0.47 | 100.00 | Contrast (Comp. Ex 25) | 437 | 37 | B | OK |
| Example 40 | Substantially hexagonal shape | 31.0 | 35 | 1.93 | 0.127 | 0.1 | 0.79 | 100.00 | Contrast (Comp. Ex 25) | 416 | 16 | C | OK |

TABLE 4

| | Defining of complete cell | Cell density (cell/cm$^2$) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Comp. Ex 27 | Substantially hexagonal shape | 62.0 | 27 | 1.36 | 0.064 | 0.064 | 1.00 | 0.00 | Reference | 100 | 0 | Reference | OK |
| Example 41 | Substantially hexagonal shape | 62.0 | 27 | 1.36 | 0.064 | 0.01 | 0.16 | 100.00 | Contrast (Comp. Ex 27) | 139 | 39 | A | OK |
| Example 42 | Substantially hexagonal shape | 62.0 | 27 | 1.36 | 0.064 | 0.02 | 0.31 | 100.00 | Contrast (Comp. Ex 27) | 134 | 34 | B | OK |
| Example 43 | Substantially hexagonal shape | 62.0 | 27 | 1.36 | 0.064 | 0.04 | 0.63 | 100.00 | Contrast (Comp. Ex 27) | 119 | 19 | B | OK |
| Example 44 | Substantially hexagonal shape | 62.0 | 27 | 1.36 | 0.064 | 0.05 | 0.78 | 100.00 | Contrast (Comp. Ex 27) | 110 | 10 | C | OK |
| Comp. Ex 28 | Substantially hexagonal shape | 62.0 | 27 | 1.36 | 0.064 | 0.064 | 1.00 | 0.00 | Reference | 200 | 0 | Reference | OK |
| Example 45 | Substantially hexagonal shape | 62.0 | 27 | 1.36 | 0.064 | 0.01 | 0.16 | 100.00 | Contrast (Comp. Ex 28) | 245 | 45 | A | OK |
| Example 46 | Substantially hexagonal shape | 62.0 | 27 | 1.36 | 0.064 | 0.02 | 0.31 | 100.00 | Contrast (Comp. Ex 28) | 236 | 36 | B | OK |
| Example 47 | Substantially hexagonal shape | 62.0 | 27 | 1.36 | 0.064 | 0.04 | 0.63 | 100.00 | Contrast (Comp. Ex 28) | 223 | 23 | B | OK |
| Example 48 | Substantially hexagonal shape | 62.0 | 27 | 1.36 | 0.064 | 0.05 | 0.78 | 100.00 | Contrast (Comp. Ex 28) | 214 | 14 | C | OK |
| Comp. Ex 29 | Substantially hexagonal shape | 62.0 | 27 | 1.36 | 0.064 | 0.064 | 1.00 | 0.00 | Reference | 300 | 0 | Reference | OK |
| Example 49 | Substantially hexagonal shape | 62.0 | 27 | 1.36 | 0.064 | 0.01 | 0.16 | 100.00 | Contrast (Comp. Ex 29) | 341 | 41 | A | OK |
| Example 50 | Substantially hexagonal shape | 62.0 | 27 | 1.36 | 0.064 | 0.02 | 0.31 | 100.00 | Contrast (Comp. Ex 29) | 337 | 37 | B | OK |
| Example 51 | Substantially hexagonal shape | 62.0 | 27 | 1.36 | 0.064 | 0.04 | 0.63 | 100.00 | Contrast (Comp. Ex 29) | 320 | 20 | B | OK |
| Example 52 | Substantially hexagonal shape | 62.0 | 27 | 1.36 | 0.064 | 0.05 | 0.78 | 100.00 | Contrast (Comp. Ex 29) | 312 | 12 | C | OK |
| Comp. Ex 30 | Substantially hexagonal shape | 62.0 | 27 | 1.36 | 0.064 | 0.064 | 1.00 | 0.00 | Reference | 400 | 0 | Reference | OK |
| Example 53 | Substantially hexagonal shape | 62.0 | 27 | 1.36 | 0.064 | 0.01 | 0.16 | 100.00 | Contrast (Comp. Ex 30) | 443 | 43 | A | OK |
| Example 54 | Substantially hexagonal shape | 62.0 | 27 | 1.36 | 0.064 | 0.02 | 0.31 | 100.00 | Contrast (Comp. Ex 30) | 436 | 36 | B | OK |
| Example 55 | Substantially hexagonal shape | 62.0 | 27 | 1.36 | 0.064 | 0.04 | 0.63 | 100.00 | Contrast (Comp. Ex 30) | 418 | 18 | B | OK |
| Example 56 | Substantially hexagonal shape | 62.0 | 27 | 1.36 | 0.064 | 0.05 | 0.78 | 100.00 | Contrast (Comp. Ex 30) | 411 | 11 | C | OK |

TABLE 5

| | Defining of complete cell | Cell density (cell/cm$^2$) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Comp. Ex 31 | Substantially hexagonal shape | 46.5 | 35 | 1.58 | 0.09 | 0.09 | 1.00 | 0.00 | Reference | 100 | 0 | Reference | OK |

TABLE 5-continued

| | Defining of complete cell | Cell density (cell/cm²) | Porosity (%) | Cell pitch (mm) | Maximum thickness $X_1$ (mm) | Thickness $X_2$ (mm) | $X_2/X_1$ ratio | Proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Example 57 | Substantially hexagonal shape | 46.5 | 35 | 1.58 | 0.09 | 0.01 | 0.11 | 100.00 | Contrast (Comp. Ex 31) | 142 | 42 | A | OK |
| Example 58 | Substantially hexagonal shape | 46.5 | 35 | 1.58 | 0.09 | 0.04 | 0.44 | 100.00 | Contrast (Comp. Ex 31) | 129 | 29 | B | OK |
| Example 59 | Substantially hexagonal shape | 46.5 | 35 | 1.58 | 0.09 | 0.07 | 0.78 | 100.00 | Contrast (Comp. Ex 31) | 117 | 17 | C | OK |
| Comp. Ex 32 | Substantially hexagonal shape | 46.5 | 35 | 1.58 | 0.09 | 0.08 | 0.89 | 0.00 | Contrast (Comp. Ex 31) | 108 | 8 | D | OK |
| Comp. Ex 33 | Substantially hexagonal shape | 46.5 | 35 | 1.58 | 0.09 | 0.09 | 1.00 | 0.00 | Reference | 200 | 0 | Reference | OK |
| Example 60 | Substantially hexagonal shape | 46.5 | 35 | 1.58 | 0.09 | 0.01 | 0.11 | 100.00 | Contrast (Comp. Ex 33) | 251 | 51 | A | OK |
| Example 61 | Substantially hexagonal shape | 46.5 | 35 | 1.58 | 0.09 | 0.04 | 0.44 | 100.00 | Contrast (Comp. Ex 33) | 235 | 35 | B | OK |
| Example 62 | Substantially hexagonal shape | 46.5 | 35 | 1.58 | 0.09 | 0.07 | 0.78 | 100.00 | Contrast (Comp. Ex 33) | 216 | 16 | C | OK |
| Comp. Ex 34 | Substantially hexagonal shape | 46.5 | 35 | 1.58 | 0.09 | 0.08 | 0.89 | 0.00 | Contrast (Comp. Ex 33) | 208 | 8 | D | OK |
| Comp. Ex 35 | Substantially hexagonal shape | 46.5 | 35 | 1.58 | 0.09 | 0.09 | 1.00 | 0.00 | Reference | 300 | 0 | Reference | OK |
| Example 63 | Substantially hexagonal shape | 46.5 | 35 | 1.58 | 0.09 | 0.01 | 0.11 | 100.00 | Contrast (Comp. Ex 35) | 354 | 54 | A | OK |
| Example 64 | Substantially hexagonal shape | 46.5 | 35 | 1.58 | 0.09 | 0.04 | 0.44 | 100.00 | Contrast (Comp. Ex 35) | 336 | 36 | B | OK |
| Example 65 | Substantially hexagonal shape | 46.5 | 35 | 1.58 | 0.09 | 0.07 | 0.78 | 100.00 | Contrast (Comp. Ex 35) | 314 | 14 | C | OK |
| Comp. Ex 36 | Substantially hexagonal shape | 46.5 | 35 | 1.58 | 0.09 | 0.08 | 0.89 | 0.00 | Contrast (Comp. Ex 35) | 307 | 7 | D | OK |
| Comp. Ex 37 | Substantially hexagonal shape | 46.5 | 35 | 1.58 | 0.09 | 0.09 | 1.00 | 0.00 | Reference | 400 | 0 | Reference | OK |
| Example 66 | Substantially hexagonal shape | 46.5 | 35 | 1.58 | 0.09 | 0.01 | 0.11 | 100.00 | Contrast (Comp. Ex 37) | 453 | 53 | A | OK |
| Example 67 | Substantially hexagonal shape | 46.5 | 35 | 1.58 | 0.09 | 0.04 | 0.44 | 100.00 | Contrast (Comp. Ex 37) | 434 | 34 | B | OK |
| Example 68 | Substantially hexagonal shape | 46.5 | 35 | 1.58 | 0.09 | 0.07 | 0.78 | 100.00 | Contrast (Comp. Ex 37) | 416 | 16 | C | OK |
| Comp. Ex 38 | Substantially hexagonal shape | 46.5 | 35 | 1.58 | 0.09 | 0.08 | 0.89 | 0.00 | Contrast (Comp. Ex 37) | 406 | 6 | D | OK |

TABLE 6

| | Defining of complete cell | Cell density (cell/cm²) | Porosity (%) | Cell pitch (mm) | Maximum thickness $X_1$ (mm) | Thickness $X_2$ (mm) | $X_2/X_1$ ratio | proportion (%) of set of intersecting portions having $X_2/X_1$ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Comp. Ex 39 | Substantially quadrangular shape | 62.5 | 35 | 1.27 | 0.11 | 0.11 | 1.00 | 0.00 | Reference | 100 | 0 | Reference | OK |

TABLE 6-continued

| | Defining of complete cell | Cell density (cell/cm²) | Porosity (%) | Cell pitch (mm) | Maximum thickness X₁ (mm) | Thickness X₂ (mm) | X₂/X₁ ratio | proportion (%) of set of intersecting portions having X₂/X₁ ratio of 0.1 to 0.8 | Type | Amount of catalyst (g/L) | Increased amount of catalyst (g/L) | Purification performance | Isostatic strength |
|---|---|---|---|---|---|---|---|---|---|---|---|---|---|
| Example 69 | Substantially quadrangular shape | 62.5 | 35 | 1.27 | 0.11 | 0.02 | 0.18 | 100.00 | Contrast (Comp. Ex 39) | 170 | 70 | A | OK |
| Example 70 | Substantially quadrangular shape | 62.5 | 35 | 1.27 | 0.11 | 0.03 | 0.27 | 100.00 | Contrast (Comp. Ex 39) | 165 | 65 | A | OK |
| Example 71 | Substantially quadrangular shape | 62.5 | 35 | 1.27 | 0.11 | 0.08 | 0.73 | 100.00 | Contrast (Comp. Ex 39) | 125 | 25 | B | OK |
| Comp. Ex 40 | Substantially quadrangular shape | 62.5 | 35 | 1.27 | 0.11 | 0.1 | 0.91 | 0.00 | Contrast (Comp. Ex 39) | 110 | 10 | D | OK |
| Comp. Ex 41 | Substantially quadrangular shape | 62.5 | 35 | 1.27 | 0.11 | 0.11 | 1.00 | 0.00 | Reference | 200 | 0 | Reference | OK |
| Example 72 | Substantially quadrangular shape | 62.5 | 35 | 1.27 | 0.11 | 0.2 | 0.18 | 100.00 | Contrast (Comp. Ex 41) | 272 | 72 | A | OK |
| Example 73 | Substantially quadrangular shape | 62.5 | 35 | 1.27 | 0.11 | 0.03 | 0.27 | 100.00 | Contrast (Comp. Ex 41) | 264 | 64 | A | OK |
| Example 74 | Substantially quadrangular shape | 62.5 | 35 | 1.27 | 0.11 | 0.08 | 0.73 | 100.00 | Contrast (Comp. Ex 41) | 225 | 25 | B | OK |
| Comp. Ex 42 | Substantially quadrangular shape | 62.5 | 35 | 1.27 | 0.11 | 0.1 | 0.91 | 0.00 | Contrast (Comp. Ex 41) | 208 | 8 | D | OK |
| Example 75 | Substantially quadrangular shape | 62.5 | 35 | 1.27 | 0.11 | 0.2 | 0.18 | 80.00 | Contrast (Comp. Ex 41) | 258 | 58 | A | OK |
| Example 76 | Substantially quadrangular shape | 62.5 | 35 | 1.27 | 0.11 | 0.2 | 0.18 | 60.00 | Contrast (Comp. Ex 41) | 243 | 43 | B | OK |
| Example 77 | Substantially quadrangular shape | 62.5 | 35 | 1.27 | 0.11 | 0.2 | 0.18 | 30.00 | Contrast (Comp. Ex 41) | 222 | 22 | C | OK |
| Example 78 | Substantially quadrangular shape | 62.5 | 35 | 1.27 | 0.11 | 0.2 | 0.18 | 12.00 | Contrast (Comp. Ex 41) | 209 | 11 | C | OK |
| Comp. Ex 43 | Substantially quadrangular shape | 62.5 | 35 | 1.27 | 0.11 | 0.2 | 0.18 | 8.00 | Contrast (Comp. Ex 41) | 206 | 6 | D | OK |
| Comp. Ex 44 | Substantially quadrangular shape | 62.5 | 35 | 1.27 | 0.11 | 0.2 | 0.18 | 3.00 | Contrast (Comp. Ex 41) | 202 | 2 | D | OK |
| Comp. Ex 45 | Substantially quadrangular shape | 62.5 | 35 | 1.27 | 0.11 | 0.11 | 1.00 | 0.00 | Reference | 300 | 0 | Reference | OK |
| Example 79 | Substantially quadrangular shape | 62.5 | 35 | 1.27 | 0.11 | 0.02 | 0.18 | 100.00 | Contrast (Comp. Ex 45) | 368 | 68 | A | OK |
| Example 80 | Substantially quadrangular shape | 62.5 | 35 | 1.27 | 0.11 | 0.03 | 0.27 | 100.00 | Contrast (Comp. Ex 41) | 360 | 60 | A | OK |
| Example 81 | Substantially quadrangular shape | 62.5 | 35 | 1.27 | 0.11 | 0.08 | 0.73 | 100.00 | Contrast (Comp. Ex 41) | 322 | 22 | B | OK |
| Comp. Ex 46 | Substantially quadrangular shape | 62.5 | 35 | 1.27 | 0.11 | 0.1 | 0.91 | 0.00 | Contrast (Comp. Ex 41) | 307 | 7 | D | OK |

(Pressure Loss)

A gas for measurement (air) was allowed to pass through the honeycomb structure or the honeycomb catalytic body at 25° C. and a flow rate of 5 Nm³/min, each of pressure of the end face at an inflow side (the first end face) and pressure of the end face at an outflow side (the second end face) was measured, and this pressure difference was calculated as pressure loss (kPa).

(Purification Performance)

First, a $NO_X$-containing gas for test was allowed to flow into the honeycomb catalytic body. Thereafter, the $NO_X$ amount of emission gas emitted from the honeycomb catalytic body was analyzed by a gas analyzer.

The temperature of the gas for test to be allowed to flow into the honeycomb catalytic body was set to 200° C. Incidentally, temperatures of the honeycomb catalytic body and the gas for test were adjusted by a heater. As the heater, an infrared imaging furnace was used. As the gas for test, gas in which 5 vol % of carbon dioxide, 14 vol % of oxygen, 350 ppm (based on volume) of nitrogen monoxide, 350 ppm (based on volume) of ammonia, and 10 vol % of water were mixed with nitrogen, was used. Regarding the gas for test, water and mixed gas obtained by mixing other gases were separately prepared, and they were mixed in a pipe at the time of performing the test and then used. As the gas analyzer, "MEXA9100EGR manufactured by HORIBA, Ltd." was used. In addition, the space velocity of the gas for test upon flowing into the honeycomb catalytic body was set to 50000 (hour$^{-1}$).

A "$NO_X$ purification rate" is a value obtained by dividing a value, which is obtained by subtracting the $NO_X$ amount of emission gas from the honeycomb catalytic body from the initial $NO_X$ amount of the gas for test, by the initial $NO_X$ amount of the gas for test and multiplying the value by 100. Regarding the evaluation on the purification performance, with respect to the $NO_X$ purification rate of the reference honeycomb catalytic body, "A" was given when the $NO_X$ purification rate was increased by 40% or more, "B" was given when the $NO_X$ purification rate was increased by 20% or more but less than 40%, "C" was given when the $NO_X$ purification rate was increased by 10% or more but less than 20%, and "D" was given when the $NO_X$ purification rate was increased by 0% or more but less than 10% or when the $NO_X$ purification rate was decreased. Regarding the evaluation on the purification performance, the cases of A to C were considered to be acceptable, and the case of D was considered to be unacceptable.

(Isostatic Strength)

The isostatic strength was measured based on an isostatic breaking strength test defined in M505-87 of automobile standards issued by Society of Automotive Engineers of Japan, Inc. (JASO standards). The isostatic breaking strength test is a test in which the honeycomb catalytic body is put in a tubular rubber container, the container is covered with an aluminum plate as a lid, and then isostatic pressing compression is performed in water. That is, the isostatic breaking strength test is a test simulating compression load weight in a case where the circumferential surface of the honeycomb structure is held by a can body. The isostatic strength to be measured by the isostatic breaking strength test is denoted as a pressure value (MPa) of pressure applied when the honeycomb catalytic body is broken. A case where the isostatic strength was 0.5 MPa or more was denoted as "OK" (acceptable), and a case where the isostatic strength was less than 0.5 MPa was denoted as "NG" (unacceptable).

(Result)

In all Examples, the purification performance and the isostatic strength were acceptable. On the other hand, in Comparative Examples, at least either the purification performance or the isostatic strength was unacceptable (the purification performance being used as a reference in the case of the reference honeycomb catalytic body). Further, in all Examples, the states of the catalyst in the honeycomb catalytic bodies after the completion of the test were observed, and as a result, peeling of the coated catalyst from the partition walls was not observed. On the other hand, in all Comparative Examples, the state in which some of the coated catalyst was peeled off from the partition walls was observed. To describe with reference to FIG. 4, according to the honeycomb catalytic body of each Example, when the catalyst layers were formed on the surfaces of the partition walls, the catalyst layers were bitten into the recess portions. Since an effect of holding the catalyst with the recess portions in this way (anchor effect) is exerted, it is considered that the peeling of the catalyst from the partition walls is less likely to occur in the honeycomb catalytic body of each Example.

The invention can be used as a catalyst carrier for loading an exhaust gas purifying catalyst.

DESCRIPTION OF REFERENCE NUMERALS

1: honeycomb structure, 3: first end face, 5: second end face, 7, 7a, 7b: cell, 9: partition wall, 10: honeycomb structure body, 11: circumferential wall, 13: complete cell, 15, 15a, 15b, 15c, 15d, 15e: intersecting portion, 17: catalyst, 19: recess portion, 20a to 20g : honeycomb structure, 30a to 30f : honeycomb structure, 35a, 35b : honeycomb structure, 40: honeycomb structure, 43: plugging portion, 45: first cell, and 47: second cell.

What is claimed is:

1. A honeycomb structure comprising:
a honeycomb structure body that includes porous partition walls defining a plurality of cells each to function as a through channel for fluid extending from a first end face as one end face to a second end face as the other end face, wherein
in a cross-section perpendicular between a direction in which the cells of the honeycomb structure body extend, portions at which the partition walls intersect to each other are intersecting portions, and in sets of the intersecting portions corresponding to 10% or more of the total number of sets of two adjacent intersecting portions, a ratio of a thickness $X_2$ of the partition wall in the intersecting portion to a maximum thickness $X_1$ of the partition wall between the two adjacent intersecting portions is 0.1 to 0.8.

2. The honeycomb structure according to claim 1, wherein, in the cross-section perpendicular to the direction in which the cells of the honeycomb structure body extend, the ratio of the thickness $X_2$ of the partition wall in the intersecting portion to the maximum thickness $X_1$ of the partition wall between the two adjacent intersecting portions is 0.1 to 0.8 in all of the sets of two adjacent intersecting portions.

3. The honeycomb structure according to claim 2, wherein, in the cross-section perpendicular to the direction in which the cells of the honeycomb structure body extend, the partition walls define complete cells, which are the cells that are not located at an outermost circumference of the honeycomb structure body, among the plurality of cells, in a substantially polygonal shape.

4. The honeycomb structure according to claim 3, wherein, in the cross-section perpendicular to the direction in which the cells of the honeycomb structure body extend, the partition walls define the complete cells in at least either a substantially quadrangular shape or a substantially hexagonal shape.

5. The honeycomb structure according to claim 1, wherein, in the cross-section perpendicular to the direction in which the cells of the honeycomb structure body extend, the partition walls define complete cells, which are the cells that are not located at an outermost circumference of the honeycomb structure body, among the plurality of cells, in a substantially polygonal shape.

6. The honeycomb structure according to claim 5, wherein, in the cross-section perpendicular to the direction in which the cells of the honeycomb structure body extend, the partition walls define the complete cells in at least either a substantially quadrangular shape or a substantially hexagonal shape.

* * * * *